US007403484B2

(12) United States Patent
Goodfellow et al.

(10) Patent No.: US 7,403,484 B2
(45) Date of Patent: Jul. 22, 2008

(54) SWITCHING FABRICS AND CONTROL PROTOCOLS FOR THEM

(76) Inventors: Maurice A Goodfellow, 27 Oldhill, Dunstable, Bedfordshire, LU6 3ER (GB); Paul J Moran, The Bye, 120 Green End Road, Hemel Hempstead, Hertfordshire, HP1 1RT (GB); John P Stubley, 105 The Park, Redbourn, St Albans, Hertfordshire, AL3 7LT (GB); Alan E Ainsworth, 136 Beaufort Park, Hampstead Garden Suburb, London, NW11 6DA (GB)

( * ) Notice: Subject to any disclaimer, the term of this patent is extended or adjusted under 35 U.S.C. 154(b) by 756 days.

(21) Appl. No.: 10/751,930

(22) Filed: Jan. 7, 2004

(65) Prior Publication Data

US 2005/0073963 A1    Apr. 7, 2005

(30) Foreign Application Priority Data

Oct. 3, 2003    (GB) .................................. 0323154.5

(51) Int. Cl.
  *G01R 31/08* (2006.01)
(52) U.S. Cl. ............................. 370/238.1; 370/395.31; 370/398
(58) Field of Classification Search ................. 370/351, 370/255, 395.31, 398, 400, 396, 395.3, 238.1
See application file for complete search history.

(56) References Cited

U.S. PATENT DOCUMENTS 5,732,072 A    3/1998    Thanner et al.

| 6,728,777 | B1* | 4/2004 | Lee et al. .................... 709/238 |
|---|---|---|---|
| 7,027,406 | B1* | 4/2006 | Shabtay et al. .............. 370/252 |
| 7,227,862 | B2* | 6/2007 | Kalkunte et al. ............ 370/389 |
| 2002/0118647 | A1* | 8/2002 | Maeno .................... 370/238.1 |
| 2002/0172203 | A1* | 11/2002 | Ji et al. ........................ 370/392 |
| 2004/0260834 | A1* | 12/2004 | Lindholm et al. ........... 709/238 |

FOREIGN PATENT DOCUMENTS

WO    WO 02/23780 A1    3/2002

OTHER PUBLICATIONS

Valdevit, Ezio; "Fabric Shortest Path First (FSPF)",Mar. 2000, Brocade Communication Systems Inc.,Revion 0.1, pp. 1-10.*
"True Router Performance Testing", brochure produced by Agilent Technologies with a copyright date of 2000.
Recent version (RFC 2328) of the OSPF (open shortest path first) routing protocol cited by the British Examiner (the RFC 2178 document), Jul. 1997.

* cited by examiner

*Primary Examiner*—Ricky Ngo
*Assistant Examiner*—DeWanda Samuel

(57) ABSTRACT

A network unit for use in a switching fabric stores for each network unit in the switching fabric a respective change identification number. In each unit this number is incremented on each change of state. The unit broadcasts protocol packets which indicates incremented change identification numbers; receives corresponding packets from the other units; and determines when the last change identification numbers in the table are the same for all the units. This allows a control based on whether all the units know that all the other units have been updated in response to all the changes of state in the fabric. The network unit can also participate in a routing algorithm, and particularly a shortest path algorithm, within a fabric that constitutes a single network entity.

11 Claims, 19 Drawing Sheets

151

152

153

154

155

SWITCHING FABRICS AND CONTROL PROTOCOLS FOR THEM

FIELD OF THE INVENTION

This invention relates to packet-based communication systems, such as Ethernet systems, and more particularly to switching fabrics composed of two or more, and generally rather more than two, network switches which are connected and controlled to constitute a single switching or routing entity. More particularly the invention relates to methods of routing and fault rectification within such a switching fabric.

BACKGROUND TO THE INVENTION

In a packet-based switching system an essential building block for the system is a switch, a term used herein for a multiple-port network device having ports capable of transmitting and/or receiving addressed packets to and from an external network and at least one 'fabric' port by means of which it is connected to at least one other device in a switching fabric.

The term 'switching fabric' is a compendious term which is intended to cover such earlier terms as 'stack' and 'cascade'. In stacked or cascaded systems, a plurality of switching devices have a mutual connection, originally in the form of a ring but more recently in the form of a mesh, which serves to convey packets between the devices or 'units' in the mesh and also, either by means of the same data path or by a separate control path, allows the passage of control or management signals between the units so that they constitute, for example, a single large switch which has available to it substantially all the aggregate of ports possessed by the individual units making up the switching fabric.

The term 'stack' originally arose because units connected together in this general way were designed to be physically stacked one upon the other. The term 'cascade' arose because in communication terms the units had a cascade connection whereby packets received at one unit and intended for transmission from another unit in the stack followed a path that visited the units in turn until the relevant unit having the desired egress port was reached, the connection of the units for this purpose resembling a cascade. Both terms are still appropriate in a figurative sense though it needs to be emphasized that an important aspect of the present invention is the connection of the units in a mesh fabric, so that the units will neither be physically stacked nor be connected, strictly speaking, in 'cascade'.

Although the term 'switch' is used herein for convenience, it needs to be emphasized that the term is used generally in relation to a device which can receive packets, examine address data therein, and, optionally subject to various forwarding or processing rules, direct them out of a port on the same unit or direct them out of a 'fabric' port to another unit in the switching fabric. In some systems of this nature, the unit that receives the packet will perform 'source routing', that is to say it will determine the final destination port before it transmits the packet out of a fabric port. However, this facility is not possessed by all units that can be accommodated into a switching fabric and one of the objects of the present invention is to accommodate units which both have and do not have a source routing facility.

Versatility of switching fabrics requires that the units may be located considerable distances apart and that they are interconnected by a mesh. As for general communication networks, the creation of loops is inherent in meshes and accordingly when configuring or providing resilience in a switching fabric, measures need to be taken to avoid, physically or dynamically, loops in the mesh.

The present invention provides a point-to-point protocol for the configuration and control of a distributed 'stack' or switching fabric.

One aspect of the invention concerns a protocol which can be employed by the units of a switching fabric to facilitate their control in several ways. The preferred protocol facilitates the computation of an optimum path for traffic from each unit to any other unit. The preferred protocol also facilitates the monitoring of and corrective action if required by, changes in the state of the fabric. In particular it facilitates a progressive disabling of links in the fabric in the event of for example a link's failure or the removal of a unit from the fabric and a progressive enabling of the links in the fabric thereafter. An important feature is the maintenance of a common system of numbering of changes in the fabric and the communication by means of the packets of information that indicates which numbered change has been communicated to each of the units. This system allows a control based on whether all the units know that all the other units have been updated in response to all the changes of state in the fabric.

Another aspect of the invention is the use of a routing algorithm, and particularly a shortest path algorithm, within a fabric that constitutes a single network entity. By 'single network entity' is meant that the fabric constitutes a single network node. If the units constitute a router, then there will be only one routing hop presented by the fabric even though a packet may visit more than one unit in the fabric. The units in the fabric may share a common network address, as described for example in co-pending applications for Weyman et al., Ser. No. 10/093,506 (2003-0147412-A1), or O'Neill et al., Ser. No. 10/337,299 filed 7 Jan. 2003, both commonly assigned herewith.

Other aspects of the invention relate to the format of packets which put the protocol into effect and state machines which act in conformity with the protocol and the information conveyed by the packets.

Reference will be made hereinafter to the accompanying drawings.

DETAILED DESCRIPTION

The description which follows concerns, among other things, a protocol that units can use in order to create a switching fabric from a multiplicity of units. The units may be interconnected in any manner providing that there is at least one direct or indirect path between each pair of units in the fabric.

Fabric Types

Figure 1:
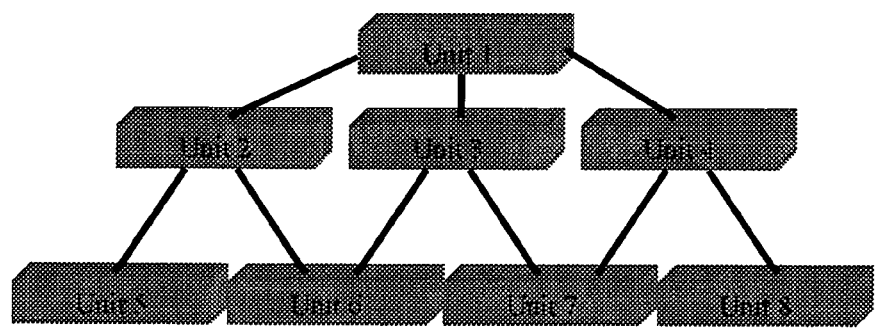
FIG. 1 is an example of a switching fabric.

FIG. 1 illustrates by way of example a fabric composed of eight network units 1 to 8.

In the fabric there are many potential paths between any pairs of units. For example a frame could be sent from unit 1 to unit 7 (a) via unit 4, (b) via unit 3 or (c) via units 2, 6 and 3. There needs to be a mechanism to arrive at an agreed path between all of the units.

One type of unit that might be used would have a source routing mechanism that allows loops to exist in the fabric. Such a unit is described in co-pending application for O'Neill et al, supra. Briefly, the unit, within the fabric, that receives an addressed frame from an external device or network performs a look-up to determine the egress port and unit, and a frame on the fabric includes a tag field which indicates whether the egress port and unit are known for the frame. The units include a mesh table and logic which by reference to the table and the tag field can inhibit frames from traversing a loop in the fabric. Eight such units may be joined together into a single fabric, and each unit can support seven fabric links—one to each other unit in the fabric.

Other units do not have this source routing capability and a modified technique should be used to form a fabric for such units. As will be explained, only two stacks of such units may be joined to form a fabric. The 2+2 implementation specifically described herein is an example of two stacks each of n units can be joined to form a fabric.

Figure 2:
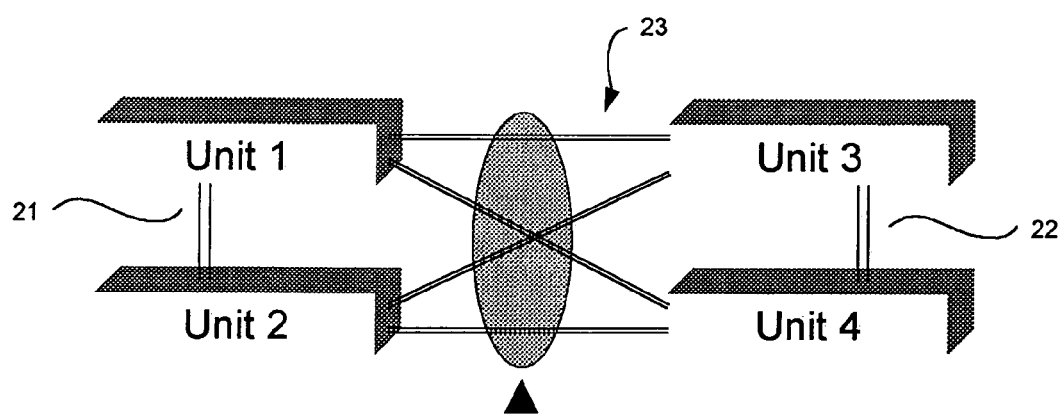
FIG. 2 is another example of a switching fabric.

Within each stack the units may be connected by a fixed cascade, called herein 'hard' fabric link; the two stacks may be connected by 'soft' fabric links. FIG. 2 illustrates an example wherein units 1 and 2 are connected using a fixed cascade link 21.

Similarly, units 3 and 4 are connected using a fixed cascade link 22. These links are called 'hard fabric links'. Such links cannot be changed. The two pairs are then connected by 'soft' fabric links 23 which can be formed into a single aggregation 24.

Procedure to Configure a Fabric

One typical but not exclusive procedure for configuration of a fabric is as follows.

(i) A network administrator decides on a fabric name and the authentication details to secure the fabric from spoofed changes.

(ii) The network administrator decides on the unit numbering of the fabric.

(iii) The network administrator then configures each unit with the fabric name and its unit number.

(iv) The network administrator configures the ports that are to be used as fabric ports. The fabric ports are the ports that will be used to link the units together. There may be some ports that can be configured only as fabric ports (depending on the units used) and cannot be configured as normal switch ports. Likewise, there may be other ports (according to the product) that can never be configured as fabric ports and can only operate as normal switch ports.

(v) The network administrator connects the units using the fabric ports.

(vi) The units exchange special packets (called herein DSPF packets, DSPF being an acronym for Distributed Shortest Path Fabric)) on the fabric ports as the physical links between the units are established. From the exchanges, each unit builds a map of the entire fabric. Each unit also builds a list of which physical ports are connected to which other units in the fabric.

(vii) Each unit independently determines which links it is going to use and programs its ASIC accordingly. This stage may be different for different types of unit.

For the example shown in FIG. 1, a routing table for each unit must be calculated and the ASIC programmed accordingly. The physical ports may be set to the forwarding state even if the source routing is not going to use the port. Separate cascade registers may determine which links will be used for traffic to and from the other units. The routing table is preferably obtained by using a Shortest Path First (SPF) algorithm as described hereinafter.

For the example shown in FIG. 2, each port will belong either to a 'hard' fabric link or a 'soft' fabric link.

Loop Protection

Since the fabric will have, in general, the form of a mesh of links interconnecting the units, it is necessary to avoid the effect of closed loops. In ordinary network practice there are known techniques, such as 'spanning tree', which are available for the purpose. However, ordinary spanning tree techniques do not make use of all of the available links. A protocol that will allow good use of all of the available links is desirable. Furthermore it is desirable to employ a protocol which can, if desired, support source routing as well as suppressing loops in the fabric when a change such as a link failure occurs.

For example, suppose that in FIG. 1 the fabric is configured to send packets from unit 1 to unit 7 via unit 3. If the link between unit 3 and unit 7 fails, the difficulty cannot simply be remedied by configuring unit 3 to dispatch traffic to unit 6 because traffic intended ultimately for unit 7 will traverse units 2 and 1 and back to unit 3.

The preferred protocol, described in more detail later, guards against loops by making changes in stages. When a change occurs, that change might mean that a first link is used instead of a second link. First, however, the second link is closed for traffic, and the first link is not used until the changes have stabilised, as described later.

Fabric Links

As used herein, the term fabric link refers to a single link or to a collection of physical links connecting two units together. Multiple links between two units are preferably automatically combined to form a fabric link. All of the physical links in a fabric link would preferably be 'trunked' together.

Fabric Ports

Before creating a fabric, a network administrator needs to specify which ports on each unit can be used to link the fabric together. While a port is configured as a 'fabric port' it cannot be used as a normal switch port. A fabric port would be blocked to all network traffic unless it were connected to another fabric port on another compatible unit. In a practical example, all ports that support fabric operation would be provided with a fabric interconnect mode item in a MIB (Management Information Base) When the fabric interconnect mode is enabled the port would be configured for fabric port operation and when the fabric interconnect mode is disabled the port would assume a normal mode of operation.

Once a port is configured as a fabric port, it is preferable that it cannot be configured by normal CLI/Web port commands and that the network administrator be no longer allowable to control features such as auto-negotiation, VLANs, static addresses, spanning tree, link aggregation, resilient links. The purpose is to allow configuration of fabric ports only by special "fabric" commands and to allow a network administrator only to enable and disable the fabric port or to swap it back to being a normal port.

Fabric Port Operation

When a port is first configured into a fabric interconnect mode, it becomes a 'fabric port'. It would interrupt the link at its end as soon as this happens. to The interruption would allow link state protocols such as LACP to realise the port is no longer a normal switch port. Any addresses learnt against the port may be flushed, to avoid connectivity problems.

Every time a fabric port detects a link to another switch, the port will attempt to initiate communication using the protocol described later, so as to determine whether it is connected to a compatible unit or fabric. Although what specifically constitutes compatibility is not intended to be a limitation on the invention, typical requirements may include any or all of the following:

the 'system name' be identical for all units;
the software versions (including optional licenses) be compatible;
all the detectable unit identification numbers (IDs) are unique: if several compatible units with the same unit ID attempt to join a fabric, then (for example) the unit with the lowest MAC address would join the fabric and the other units with duplicate Ids would be excluded from the fabric;
the units have the same authentication key or simple password; and
the units are from the same ASIC type.

If a unit finds a compatible unit or fabric, then the unit joins the fabric.

If a unit does detect a neighbouring fabric but determines that it is incompatible for one of the above reasons, then it would preferably do the following:

(i) prevent all network traffic from being received from the port; and
(ii) prevent all network traffic from being transmitted to the port.

If a port consists of multiple aggregated physical ports the port may be treated as a single port from a software point of view. Thus, any special protocol packets (as described later) will only be transmitted and received on one of the physical ports. This is transparent to the protocol, however, since the port appears as a single interface.

DSPF Protocol

The preferred DSPF (Distributed Shortest Path Fabric) protocol is a point-to-point exchange of packets between two fabric ports. Each fabric port communicates to its directly attached partner fabric port.

The protocol allows each fabric port to learn about its directly attached partner port and unit and to fill in the partner fields in a fabric port table. This partner information may be contained in the MIB table.

The protocol also allows each unit to maintain a single fabric unit table that describes all the fabric connections within the fabric. When a unit detects or is notified about changes that will change the contents of its fabric unit table, it promptly propagates these changes to the other units in the fabric.

When the fabric unit table changes, each unit is required to re-process the fabric port table and fabric unit table information. The reprocessing might mean a reconfiguration of the unit's own fabric ports.

Format of DSPF Packets

There are two types of packet sent as part of the DSPF protocol; the 'partner' DSPF packet and the 'unit' DSPF packet. The 'partner' DSPF packet contains the per-port information. Since the packet contains information about the sending port, the packet is sent to each port separately. The unit DSPF packet conveys per-unit information. Since the packet contains information about the overall unit's view of the fabric, such a packet can be sent to several ports simultaneously. All types of DSPF packet may be transmitted using a protocol such as SNAP to a reserved multicast address. To simplify the calculation of a message digest, the DSPF packets may each be a multiple of a fixed number of bytes (such as 4). Variable length fields may be padded with zeroes to achieve this.

TABLE 1

| 31 | 23 | 15 | 7 | |
|---|---|---|---|---|
| DSPF type = 1 | Partner fabric port state | Name length | Tx Unit Id | Auth. Type |
| Authentication data (16 bytes) | | | | |
| Reserved1 | | Reserved2 | | |
| MAC address of | Tx unit | | | |
| | | | ifIndex of Tx physical port | |

The name of the fabric. The number of bytes is given in the Name Length field above. The length of this field depends upon the length of the fabric name. It shall however be padded with zeroed data so that it becomes a multiple of 4 bytes long.

Format of DSPF Partner Packets

Table 1 above shows the significance of each field in a DSPF partner packet. The packet preferably consists of an integral multiple of four bytes. The top margin of the table shows the bit number of the first bit in each byte in the 4-bit segment.

The first field, bits 31 to 24 in the first 4-byte segment, is a type field, which may be arbitrarily selected as an indication of the type of DSPF being used. For the sake of example the type defined for the packet will be '1' i.e., DSPF partner packet version 1. The next field, bits 23 to 16 or the second byte in the first 4-byte segment, is a fabric port state enumeration for the physical port that is transmitting the packet. This enumeration is required to allow the receiving unit to detect how the transmitting unit is treating the physical link. For example, the receiving unit might detect that the transmitting unit has not yet received any DSPF packets.

The third field, bits 15 to 8 in the first 4-byte segment, is a name length field, which indicates the length of the name assigned to the fabric by a network administrator. As will be described below, the name is situated at the end of the packet so that the length of the name is not constrained. The name length field will contain the length of the name without any trailing zeros.

The final byte in the first 4-byte segment consists of two 4-bit fields, bits [7:4] being a unit identification number that a network administrator has assigned to the unit which transmits the packet. The second field in this byte, bits [3:0] is a field which indicates an authentication type being used to form the following 16 bytes of authentication data. Preferably there are three authentication types. A first type, which may be denoted 'no authentication' will indicate that no other authentication is required and that the authentication data is composed of all zeros. An authentication type of a 'simple password' will indicate that the network administrator has assigned a password. A T-value would be placed in the authentication field.

A third type, called for convenience 'MD5', would indicate that the authentication data holds a message digest of the packet starting at the DSPF version field and terminating at the end of the unit name. The authentication data may be set to all zeros before the digest is calculated. The fabric authentication key would be padded out with zeros before the calculation of the digest. For the purpose of the digest the unit then may be padded out to a multiple of four bytes by appending terminal zeros.

In this specific example, the next four bytes, that is to say bytes 25 to 28 in the fifth row, a reserved for possible future use. In Table 1 the first two bytes of this segment are denoted 'Reserved1' and the following two bytes are denoted 'Reserved2'.

The next six bytes, in this example, contain the MAC address of the transmitting unit.

As noted above, if more than one unit has been configured with the same unit identification number in the fabric, then only the unit with the lower MAC address is accepted into the fabric. The link to the other unit would be blocked to any other network traffic.

The MAC address extends (in this example) to the end of the second byte in the eighth 4-byte segment. The last two bytes in this segment, bits [15:0] are an 'ifIndex' of the physical port that is transmitting the packet. This index is required in order to create a MIB item for various purposes.

Format of DSPF Unit Packets

The format of DSPF unit packets is shown in Table 2 below.

| 31 | 23 | 15 | 7 |
|---|---|---|---|
| DSPF type = 2 | Timer Source Unit Id | Name length | Tx Unit Id Auth. Type |
| Authentication data | | | |
| (16 bytes) | | | |
| Partner resend Time | | unit resend Time | |
| MAC address of | Tx unit | | |
| | | Sequence Number | |
| MAC address of | unit in fabric | | |
| | | Unit's Last Change ID | |
| Unit's Product Family | Unit's XRN | Options | Unit's |
| | Version ID | Length | Fabric State |
| Path Cost direct to get to unit 1 | | Path Cost direct to get to unit 2 | |
| Path Cost direct to get to unit 3 | | Path Cost direct to get to unit 4 | |
| Path Cost direct to get to unit 5 | | Path Cost direct to get to unit 6 | |
| Path Cost direct to get to unit 7 | | Path Cost direct to get to unit 8 | |
| Received Last Change ID from unit 1 | | Received Last Change ID from unit 2 | |
| Received Last Change ID from unit 3 | | Received Last Change ID from unit 4 | |
| Received Last Change ID from unit 5 | | Received Last Change ID from unit 6 | |
| Received Last Change ID from unit 7 | | Received Last Change ID from unit 8 | |
| The unit's Options information. The number of bytes is given in the Options Length field above. The length of this field depends on the product family for this unit. It shall however be padded with zeroed data so that it becomes a multiple of 4 bytes long. | | | |
| Repeat the previous section 7 more times, once for unit 2, once for unit 3 and so on. | | | |
| The name of the fabric. The number of bytes is given in the Name Length field above. The length of this field depends upon the length of the fabric name. It shall however be padded with zeroed data so that it becomes a multiple of 4 bytes long. | | | |

The content of the DSPF unit packets in this example is as follows.

Byte 1, i.e. bits [31:24] of the first 4-byte segment of the packet data is an indication of the type of the DSPF protocol being used. The type defined for this packet may be '2'="DSPF unit version 1". Should a new version of this packet type be required, a new type would be used.

The second byte contains the timer source unit ID and the third byte contains the name length, like the same fields in the DSPF partner packet.

The fourth byte contains the transmitting unit ID and the authentication and type, like the same fields in the DSPF partner packet.

The next 16 bytes comprise the authentication data, like the DSPF partner packets.

The sixth 4-byte segment contains the values of a 'fabric unit resend time' and the 'fabric partner resend time' in milliseconds. The source of these is the 'Timer source unit ID, stated above. If a unit receives a different value timer from one of its neighbours, and the source unit encoded has a lower unit ID, then the receiving unit should change its timer settings to the received settings and store the new values in PDS. It would then send out the new timer values and source ID to its neighbours, so its neighbours can learn them.

The next six bytes contain the MAC address of the transmitting unit, like the same field in the DSPF partner packet.

The last two bytes of the tenth segment contain a sequence number of the transmitted packet. This is used to process quickly unit packets that have been multicast across several ports in the same fabric link.

For each of the eight units that (in this exemplary embodiment) could form part of the fabric there is an information section. Units that do not exist will have all the respective fields set to all zeros.

The information section for each unit contains the MAC address of the unit. This is needed for validation of units that are joining the fabric. If a unit sees that the MAC address assigned to a unit has changed, it is a sign that a new unit has joined the fabric and that the unit previously identified by the section has been removed excluded from the MAC address is that of the unit whose table it is, then if the MAC address is lower than the 'own unit', the own unit has been excluded from the fabric; if the MAC address is higher than the own unit, the own unit has not yet been observed by the other unit. If the MAC address is zero, the unit does not exist in the fabric.

The field 'Product Family' is an indication of the product line of the unit. This field may be used in a test for 'compatibility'.

The field denoted 'XRN Version' is an indication of the version of the software which is installed on this unit.

The field entitled 'Unit's Last Change ID' is a number that increments whenever the respective unit detects a change in the fabric topology. This is an important control, and is discussed later.

The field entitled 'Unit's Fabric State' is an enumeration of the state of the fabric state machine for this unit. The receiving unit uses fields to determine when it may change its own fabric state from 'ready' to 'configured' and from 'configured' to 'stable', as discussed in relation to FIG. 4.

There follows a list of link state 'path costs' to each unit. This has an entry for every unit to which the unit may have a direct physical connection. A cost of zero indicates that no such link exists. A variety of measures of path costs could be employed. In the present example the path cost is a value obtained by dividing 1,000,000 by the sum of the link speed in Mb/s of all the connected links. Thus a 100 Megabits/sec link would have a path cost of 10,000 and a 10 Gigabit/sec link would have a path cost of 100. If a pair of units is connected by two (parallel) 10 Gigabits/sec links, the path cost would be 50. In this example the path cost, except for the limiting case of zero, inversely represents the maximum data rate of the respective link.

For each unit there is a list of 'last change identifiers' that this unit has received from each of the other units in the fabric.

The information section finally includes the 'options information' of the unit. This is optional information that is not needed by the protocol, but may be needed by higher levels to stabilise the fabric. This optional information must not cause the unit packet to exceed the maximum transmissible frame. The options information field is padded out with zeroed data so it is a multiple of four bytes long. The 'Options Length' field will contain the length of the options list without any padding bytes.

Timer Values

The following timer values should be implemented such that they can be tuned via changing a MIB item. The values here are exemplary only.

Fabric Partner Resend Time—this is the per-port time between retransmissions on the Partner DSPF on a fabric port. If there are no other changes to the port, a Partner DSPF will be sent with this period, regardless of the state of the fabric. This time is also used to timeout a fabric link connection that is no longer operating correctly, since if a port does not receive a Partner DSPF after three Partner Resend Time periods, the port changes state to noPartner. This value may be five seconds.

Fabric Unit Resend Time—this is the time between a unit DSPF being sent, and the next unit DSPF being sent. If there are no other changes to the fabric, but the fabric is still not stable, another unit DSPF will be resent again after this time. The value may be 200 milliseconds.

Fabric Unit Table

Each unit has a single fabric unit table to store the fabric-wide information gathered from all the fabric ports and the DSPF protocol exchanges. All of the fields correspond to values sent in the DSPF unit protocol. Some of the elements of this table may be rendered visible to the user. The table, like other tables described herein, is preferably constituted by identified storage locations defined and controlled by appropriate software.

An example of a fabric unit table is shown in Tables 3A and 3B; the latter is merely a continuation of the former.

TABLE 3A

| From Unit | MAC Address | Last Chng | Prod Fmly | XRN Ver | Fabric State | Path Cost to the other units |||||| 
|---|---|---|---|---|---|---|---|---|---|---|---|
| | | | | | | 1 | 2 | 3 | 4 | 5 | 6-8 |
| 1 | 11:11:11:11:11:11 | 20 | 2 | 1 | Stable | — | 1000 | — | — | 10000 | — |
| 2 | 22:22:22:22:22:22 | 30 | 2 | 1 | Stable | 1000 | — | 1000 | — | 1000 | — |
| 3 | 33:33:33:33:33:33 | 40 | 2 | 1 | Stable | — | 1000 | — | 10000 | — | — |
| 4 | 44:44:44:44:44:44 | 50 | 2 | 1 | Stable | — | — | 10000 | — | 1000 | — |
| 5 | 55:55:55:55:55:55 | 60 | 2 | 1 | Stable | 10000 | 1000 | — | 1000 | — | — |
| 6 | 00:00:00:00:00:00 | 0 | 0 | 0 | — | — | — | — | — | — | — |
| 7 | 00:00:00:00:00:00 | 0 | 0 | 0 | — | — | — | — | — | — | — |
| 8 | 00:00:00:00:00:00 | 0 | 0 | 0 | — | — | — | — | — | — | — |

TABLE 3B

| From Unit | Received Last Change IDs |||||| 
|---|---|---|---|---|---|---|
| | 1 | 2 | 3 | 4 | 5 | 6-8 |
| 1 | 20 | 30 | 40 | 50 | 60 | 0 |
| 2 | 20 | 30 | 40 | 50 | 60 | 0 |
| 3 | 20 | 30 | 40 | 50 | 60 | 0 |
| 4 | 20 | 30 | 40 | 50 | 60 | 0 |
| 5 | 20 | 30 | 40 | 50 | 60 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |

The table represented by Tables 3A and 3B is constituted by information obtained from the DSPF exchanges. In the example given, only units 1 to 5 are members of the fabric. The other notional members either do not exist or are not members of the fabric.

The table identifies, for each unit ID, in this example up to eight units, the MAC address of the respective unit, a 'last change' identifier, the product family, the software version, the notified fabric state, the path costs to all the other units, and the last change identifiers both of the respective unit and as received from all the other units.

Thus for example the first line of the table shows the MAC address 11:11:11:11:11:11, a last change identifier of 20 units, the product family type 2, the software version 1, and the fabric state as stable. There is obviously no path cost to unit 1, which is the self-same unit. Unit 1 is directly connected to units 2 and 5, but not directly to unit 3. The cost of the path between unit 1 and unit 2 is 1000 and the path cost from unit 1 to unit 5 is 10,000. the received last change ID for unit 1 is 20, necessarily corresponding to the last change in the same row. It has received last change IDs of 30, 40, 50 and 60 respectively from units 2, 3, 4 and 5. Obviously no received last change identifiers are shown for units 6 to 8 since there are no such units in the fabric at present.

Figure 3:
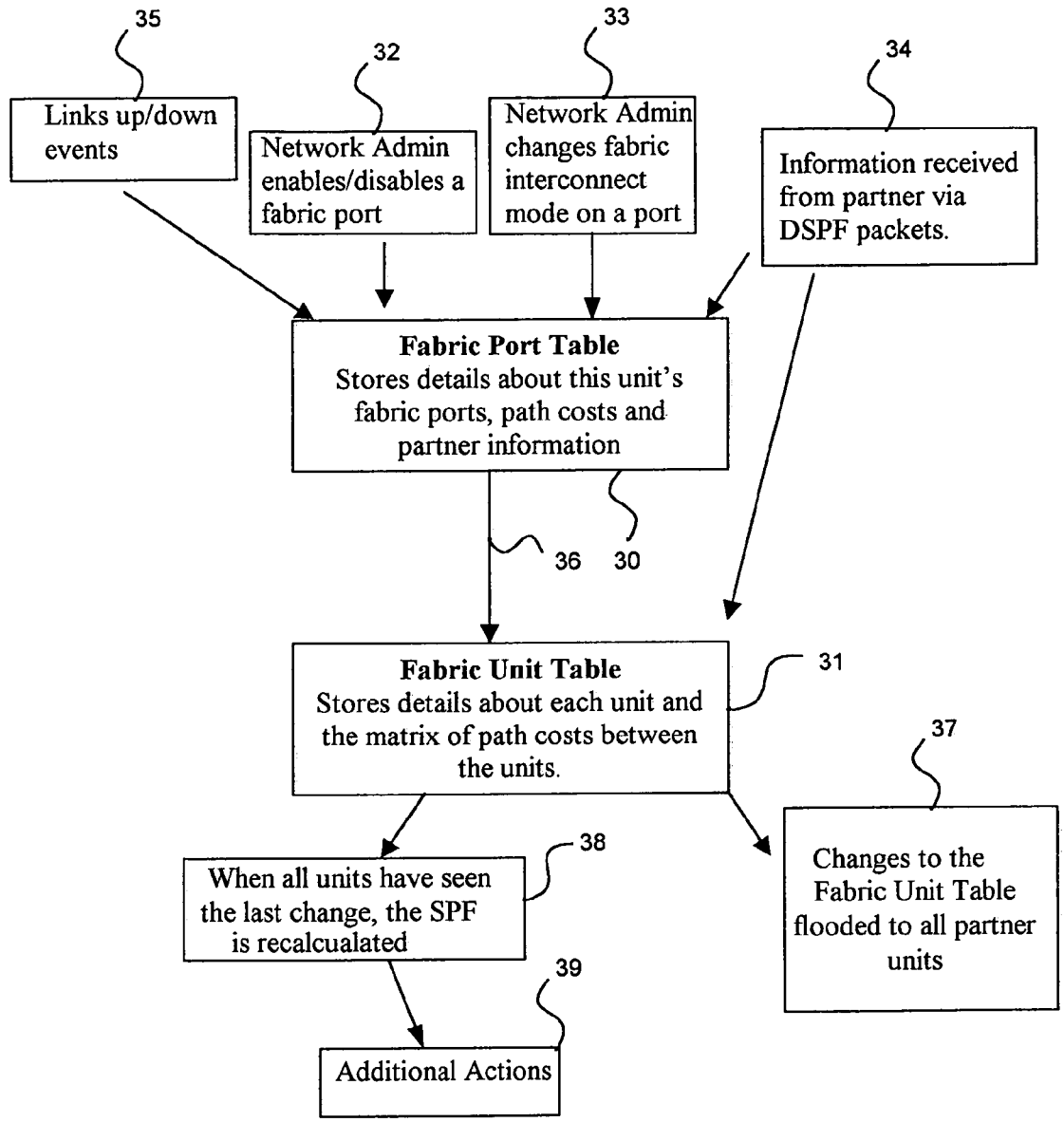
FIG. 3 illustrates a control flow.

FIG. 3 illustrates in general terms and information flow to and from a fabric port table 30 and a fabric unit table 31.

The fabric port table 30 stores the details of the respective unit's fabric ports, the respective path costs and the unit's link partners. The fabric unit table stores the details about each unit and a matrix of path costs between the units. As will be apparent later, information from the fabric unit is employed to compile a routing table for the fabric.

The fabric port table is influenced by a network administrator, who may enable or disable a fabric port (stage 32) or may change a fabric interconnect mode on a port. It is also influenced by events (35) on a respective link. It also receives data from a link partner by means of DSPF packets (34). It provides data (36) to the fabric unit table 31.

The fabric unit table 31 receives data as aforesaid from the fabric port table and from received DSPF packets (34).

Changes to the fabric unit table 31 are flooded (broadcast) to all the units in the fabric, i.e. all 'partner' units (stage 37). When all the units have received the last changes to the units, the routing within the fabric is recalculated (38). There may be additional actions (39) as described later.

Fabric State Machine

Overview

Each unit will have a fabric level state machine for keeping track of how the fabric configuration is proceeding. An example of the fabric level state machine is shown in FIG. 4.

Figure 4:
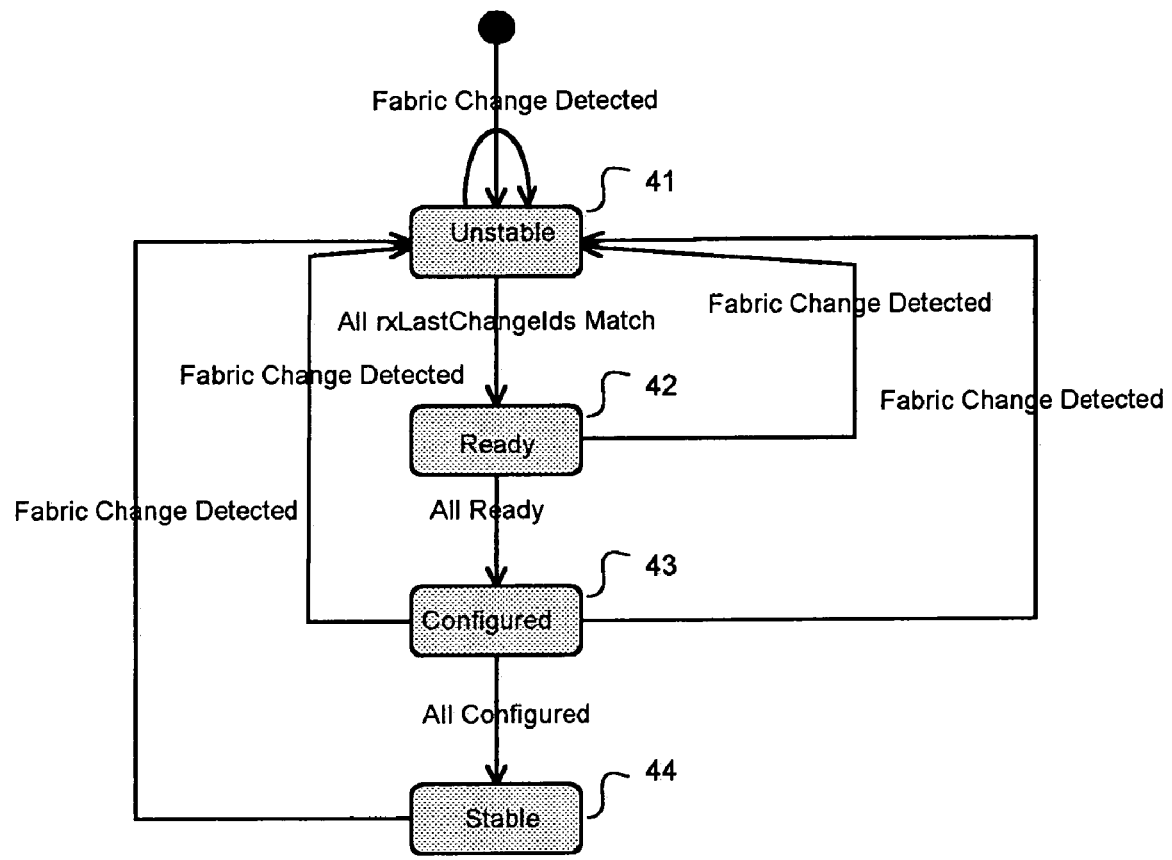
FIG. 4 illustrates a fabric state machine.

With reference to FIG. 4, the fabric level state machine has four principal states, which are denoted 'unstable' 41, 'ready' 42, 'configured' 43 and 'stable' 44.

There is a transition from any of the states 42, 43 and 44 in the event of 'fabric change detected'. This denotes a change detected in the fabric unit table. Such a change may be caused either by a local event or a change in a remote unit. The actions consequent on the event 'fabric change detected', apart from the transition to the 'unstable' state 41, are preferably two-fold. All fabric ports are blocked to user traffic to prevent loops occurring, and DSPF packets are sent in order to re-compute the connections. Reserved multicast traffic such as LACP may or may not be blocked. If the unit is already in the 'unstable' state it reverts to this state on the event 'fabric change detected'.

The state machine transitions from the unstable state 41 to the 'ready' state 42 on detection of the event 'all rxLastChangeIds Match'. This event occurs when all the last change IDs in the respective fabric table are the same for all known units. The significance of the event is that the fabric is no longer changing and all units are aware of all changes. The action consequent on the event is to send DSPF packets to inform all the other units that this unit is ready to configure the fabric afresh.

The 'ready' state 42 transitions to the 'configured' state 43 when all units have notified that they are no longer in the unstable state. The corresponding actions are to reconfigure the fabric hardware and to send DSPF unit packets informing all the other units that this unit has been configured.

Finally, the 'configured' state 43 transitions to the 'stable' state 44 when all units have notified that they are no longer in the unstable state or the ready state. The consequential actions are the sending of DSPF unit packets to inform all the other units that this unit is stable; the unblocking of all the fabric ports; and the cancellation of the unit's resend timer.

The 'last change identifier' is in this example a simple incrementing number that enumerates the current configuration of a unit, with regards to fabric operation. As well as storing its own lastchangeId, a unit will also store the last change identifier that it knows for other units in the fabric. Thus each unit can determine whether the other units have seen all its changes. A unit will increment its own last change identifier whenever there is a local change in a relevant local state or characteristic, for example any of the unit identifier, the authentication details, the fabric timers, the physical address, the product family, or the direct unit-to-unit path cost from this unit to any other directly connected unit.

Whenever the last change identifier increments, the unit changes its fabric state to 'unstable', and the updated fabric unit table is immediately transmitted on all fabric links. This means that the change is propagated very quickly throughout the fabric. At the same time the fabric unit resend timer is started. At this point, all fabric ports are blocked to prevent any loops from occurring. The ports are blocked to all higher level traffic, including user traffic. Only DSPF traffic is allowed through.

Different mechanisms (depending on the particular switch type) may be needed to 'block' the ports. For example the ports may be removed from VLAN forwarding and membership registers. Alternatively the forwarding engine may be caused to forward all traffic to a 'null' port, i.e. a virtual port which merely has an identification number.

When unit data is received, the last change identifier is compared to the last change identifier in the fabric unit table for each unit in the message. The received information changes data in the fabric unit table only if the new information has a higher 'last change identifier'. Older information will be received via loops in the fabric and should be discarded. When a unit receives a higher last change identifier from another unit, it will reflect that by changing its own received last change ID for that unit to the new value. When this unit then transmits a unit DSPF packet, the other units will determine that this unit has seen other units change, and will be aware that the information has propagated through the fabric correctly.

Exchange of DSPF Packets

Figure 5A:
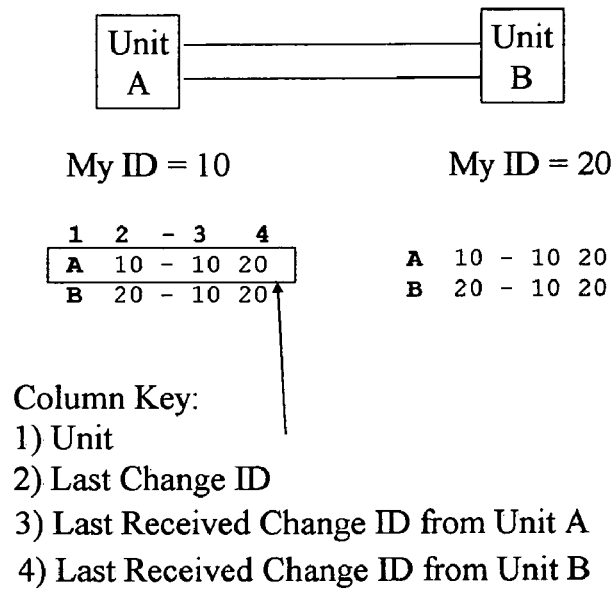
FIGS. 5A and 5B illustrate a control flow according to a preferred protocol.
Figure 5B:
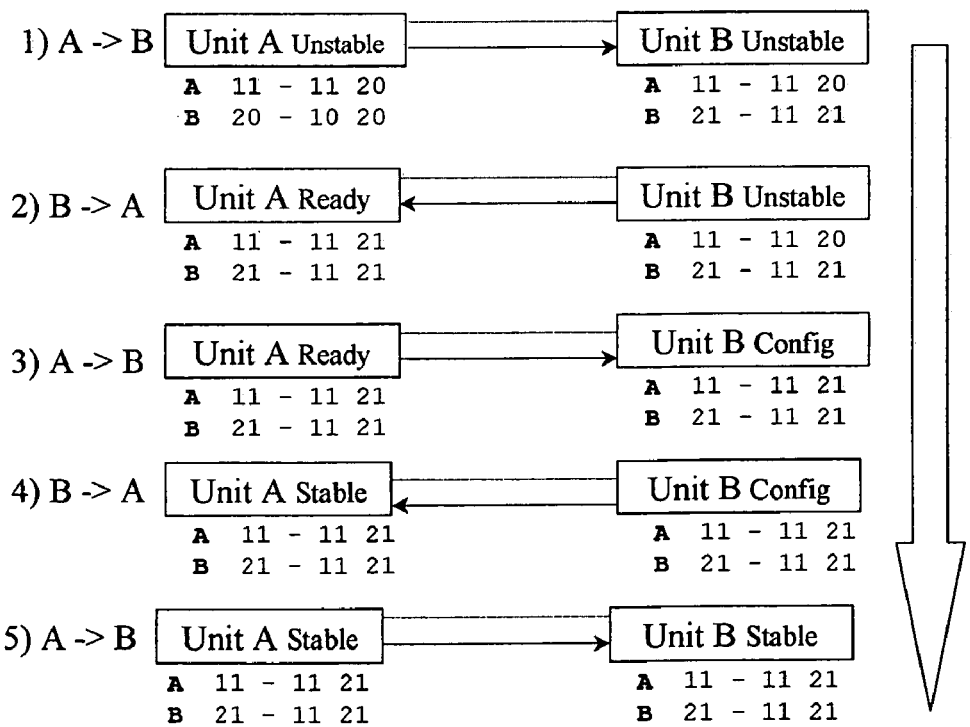

An example is shown in FIGS. 5A and 5B. For example, imagine a simple two-unit fabric with units A and B that have a last change ID of 10 and 20 respectively. Every unit will store both the last change ID seen from every other unit, as well as the list of received last change IDs that the other unit sent. In FIG. 5A, the 'last change' IDs for units A and B are 10 and 20 respectively. Below each unit is shown in simplified form the fabric unit table, having 'columns' for the unit, that unit's last change ID, and last change ID received from each of the units (including itself).

Now suppose that one of the two (aggregated) links between units A and B fails. This failure will cause both A and B to increase their last change IDs and send them via DSPF packets to each other.

It will be presumed that the units are initially in the stable state (FIG. 4). Since both units have detected a change in their own last change IDs, both units transition to the 'unstable' state. FIG. 5B illustrates various stages in the exchange of last change identifiers between units A and B. In each of the rows (1) to (5) of FIG. 5B, the state of each unit is shown; below the respective box are shown the relevant contents of the fabric unit table, i.e. the last change IDs. In each case each unit will be sending to the other DSPF packets containing (among other things) the last change IDs of which it is aware. FIG. 5B (1) illustrates that unit A is sending a fabric state packet to unit B.

The last change ID for unit A has become 11 but as yet that unit does not know that there is a change in the last change ID for unit B. Thus the packet, illustrated under unit A in FIG. 5B (1) indicates the last change ID for unit A as 11 but indicates a last received change ID from unit B as 20. unit B's fabric table shows now '11' for the last change ID for unit A. It shows the last received change ID for unit B as received from unit A as 20 but it will have received its own last change ID and updated this to 21.

As shown in FIG. 5B (2), unit B, still in the unstable state, transmits a packet back to unit A. Unit A's fabric table has the received matching last change IDs and so it can transition to the ready state, although unit B is not yet aware of this. Unit A is aware that unit B has seen both last change IDs. In practice unit B may not have seen A's changes before unit B starts transmitting so that it might initially send back an old version of the last received change ID from unit A back to unit A. However, in this example unit B will send A's last change ID back to A.

Figure 8:
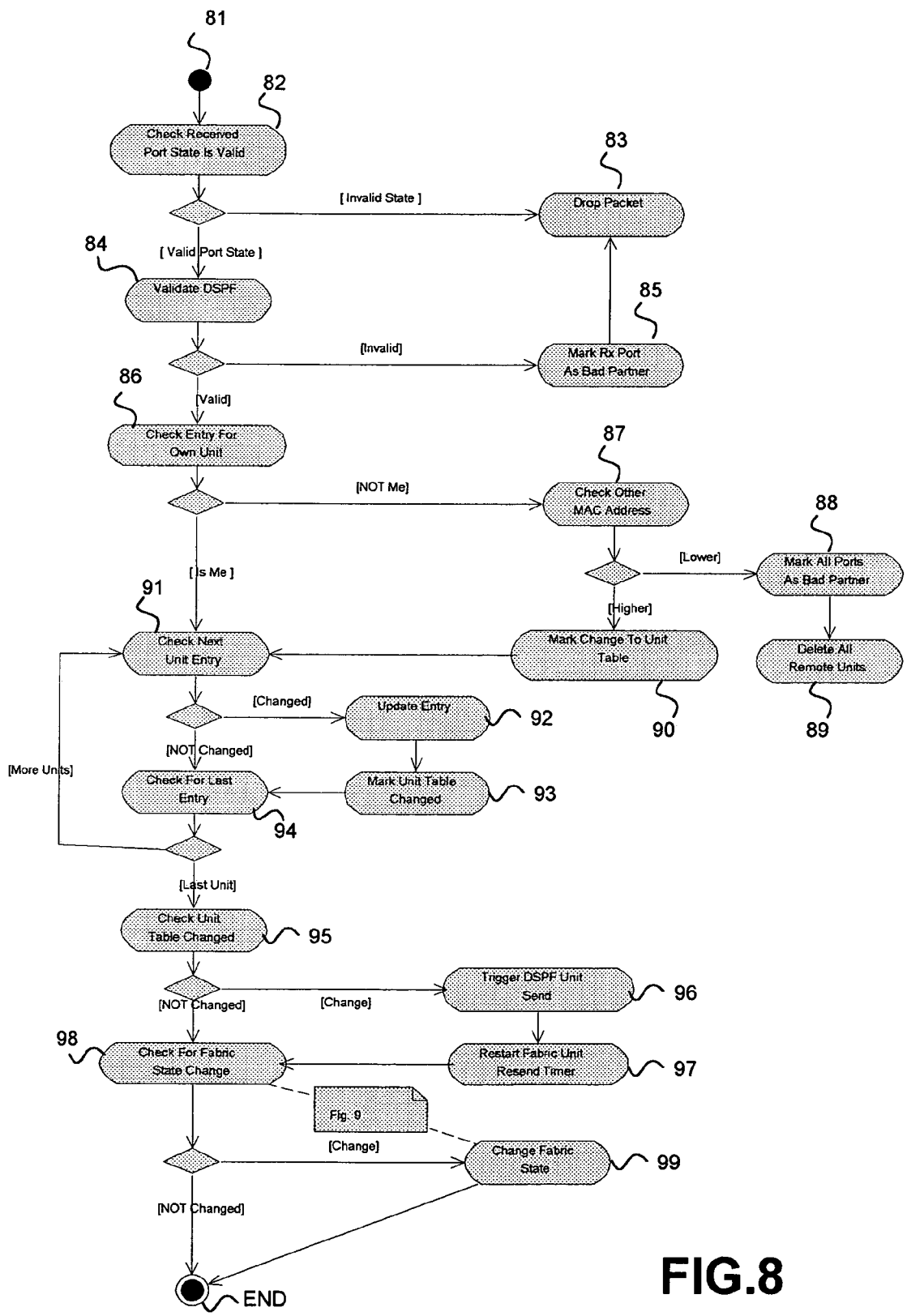
FIG. 8 is a flowchart for processing incoming 'unit' packets.

At this point all of the last change information has propagated and each of the units knows that the other has seen its changes. B will enter the ready state but because A is already in the ready state, unit B can immediately proceed to the configured state as shown by stages 42 and 43 in FIG. 4. B now sends its new state to A, as shown in FIG. 8 (4). Unit A receives B's message which allows unit A to enter the configured state. Since unit A knows that unit B is already in the configured state, unit A can proceed to the stable state.

Finally, as shown in FIG. 5B (5) unit A can inform B that it is now stable so that unit B can become stable. Since both unit A and unit B are both stable, no more unit packets need to be exchanged.

Should a packet be lost, then the received last change IDs would not be updated, so when the unit next sends, the receiving unit will realise it has to send its information again.

In practice, the last change IDs may be held in recycling registers. If so, a modification is needed to accommodate the eventual wrap around. Thus if the lastChangeId received is less than a predetermined small value (such as 500) and the previous value was greater than a larger value (such as 6000), it can reasonably be assumed that the ID has undergone a wrap-around, so an apparently lower value for the last change ID may be deemed an increased last change ID.

When a unit receives a unit DSPF packet, it can check to see if the remote unit thinks the local unit has a higher lastChangeId than it currently has. If this is true then the local unit must be replacing a unit that used to be a member of the fabric (or the local unit has changed unit ID). The local unit should set its own lastChangeId to one greater than the change ID in the message, and send out a unit DSPF. That way the remote unit will see this unit.

When the fabric unit resend timer expires, the received last change identifiers for all the known units are checked. If they are identical, then all units will know about other units changes. The fabric is ready to be reconfigured. If the fabric's state is still unstable, then it is moved to 'ready'. If they are not identical, then one or more units may have missed a change. The fabric's state is forced to unstable (unless it's already 'unstable'), a new DSPF unit packet is transmitted and the fabric unit resend timer is restarted.

If the fabric recalculation determined that some links should now be used for traffic, they would not set to forwarding until the fabric had been reconfigured. Only when the fabric enters the stable state are all 'good' fabric ports unblocked.

The ports would be unblocked to the next layer of fabric configuration. The upper layer subsystems might not immediately allow user traffic through. They might need time for the fabric-wide features, such as RSTP (Rapid Spanning Tree as in IEEE Standard 802.1w), to stabilise the network topology. At some time appropriate, the upper layers would unblock the ports to user traffic.

Transmission of DSPF Packets

DSPF packets should only be sent to ports in 'fabric interconnect' mode. Packets should never be transmitted to fabric ports in a 'badPort' state, since a link to such a port has been determined to be unsuitable for DSPF transmission.

DSPF packets must be capable of being sent to fabric ports that are blocked to user traffic.

A DSPF partner packet needs to be sent to each destination fabric port individually, because it contains data relevant to the source port transmitting the packet. The fabric partner resend time for a port is restarted whenever a partner packet is sent. Partner packets are sent to a port whenever the local port state changes (including the gain of a physical link); a change in the partner's port state is received; or the fabric partner resend time for the port expires.

A DSPF unit packet may be sent to all suitable fabric ports simultaneously, because it contains only per-unit information. Each unit packet will contain a sequence number used to identify each attempted transmission, regardless of the contents of the packet or the cause of the transmission attempt. The fabric unit resend time is restarted whenever a unit packet is sent. Unit packets are sent to all suitable fabric ports whenever the fabric unit table changes (either from a local change or a received change); the authentication information for the fabric changes; or the fabric unit resend time expires, and the received lastChangeIds for all known units do not match.

Fabric Unit Resend Timer Expiry

Figure 6:
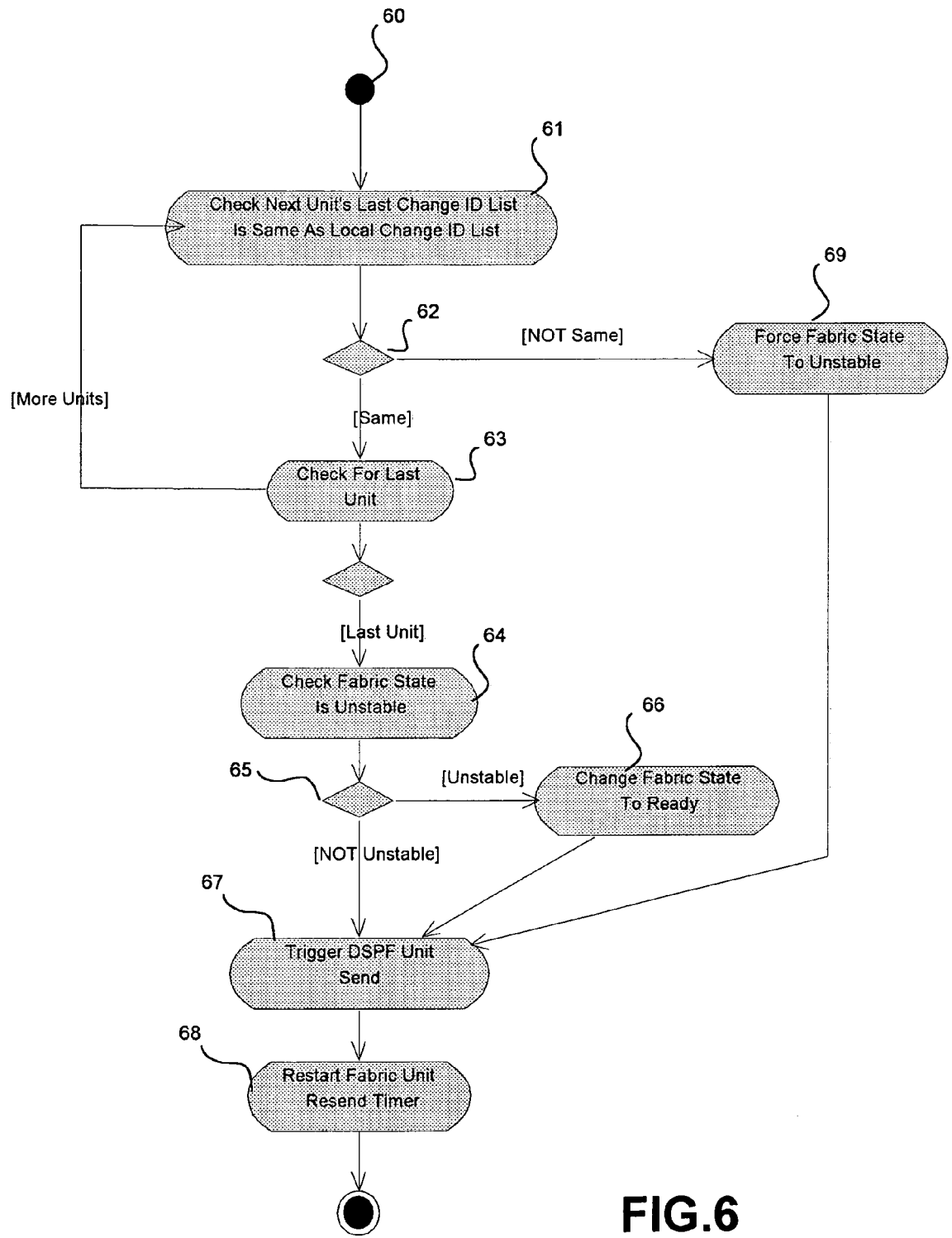
FIG. 6 is a flowchart for a resend timer expiry process.

FIG. 6 is a flowchart which shows what happens when the unit resend timer times out.

The fabric unit resend timer is used in the unstable state to cater for the case where a unit misses a DSPF unit packet, and thus has not seen all of the information it needs to enter the ready state. When the timer expires (stage 60), the last change ID lists are checked in turn, stages 61, 62 and 63 to see if they are identical. If they all match (stage 64) and the fabric is unstable (stages 64 and 65), the fabric is moved from the unstable state to the ready state (stage 66). In any event, DSPF unit packets will be sent (stage 67) and the timer will be restarted (stage 68).

If the last change ID lists do not match, then the fabric is still unstable (stage 69). At this point the unit sends a DSPF unit packet (stage 67) containing its current data and re-starts the unit resend timer (stage 68).

In fabric states other than the unstable state, the timer is used slightly differently as shown in Table 4.

TABLE 4

| Current State | Check | If Check Passes | If Check Fails |
|---|---|---|---|
| unstable | See above | resend unit packet Restart timer | Change to ready state resend unit packet Restart timer |
| Ready | If any unit still in the unstable state | resend unit packet Restart timer | Change to configured state resend unit packet Restart timer |
| configured | If any unit still in the unstable or ready state | resend unit packet Restart timer | Change to stable state resend unit packet Restart timer |
| Stable | If any unit still not in the stable state | resend unit packet Restart timer | No actions |

Fabric Partner Resend Timer Expiry

The fabric partner resend timer is used to cater for the following cases:

(i) A partner leaves the fabric without causing a link state change on its connected ports. This could be because there is some intermediate device, such as a repeater, that is still providing a physical link, even though the partner has failed.

(ii) For some reason, there is a lack of connectivity on the port, and either DSPF packets are not being received or are not being transmitted. This could include a faulty link of some kind, or a misconfigured port at one end.

When the timer expires, a DSPF partner packet is sent on the port, containing the current partner and local port states. The timer is then restarted, regardless of the state of the fabric.

If no partner packets have been seen on this port in the previous three timer periods, then the port state is changed to noPartner, and a DSPF partner packet is sent. If this change affects the path costs in the fabric unit table, then this will also cause the fabric to enter the unstable state.

Processing of Link State Changes

Figure 7:
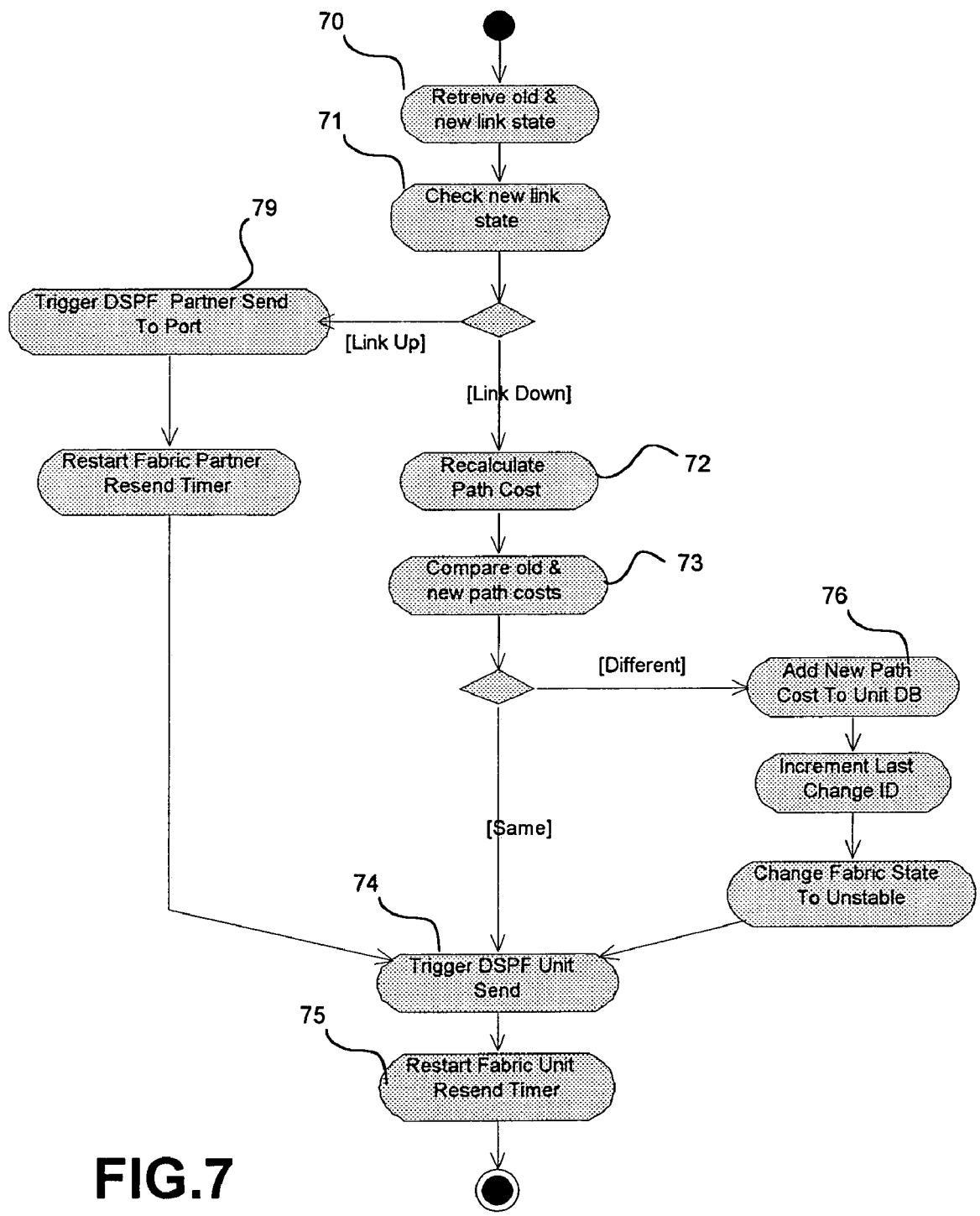
FIG. 7 is a flowchart for the processing of a link state change on a port.

FIG. 7 is a flowchart which shows the processing of a link state change on a port in fabric interconnect mode.

Stages 70 and 71 in FIG. 7 indicate the monitoring of the state of links. This may be part of the functions of the MAC device of a port. If, as indicated by the 'link down' result from the comparison of the new link state with the old link state, the path costs from this unit to the neighbour will be recalculated, as shown by stage 72. The old and new path costs will be compared, stage 73. Any resultant path cost change would cause a change to the fabric unit table. A path cost change will require the entire fabric configuration to be recalculated (as described later) and so the fabric state will be changed to indicate the unstable state. This is shown by stages 76, which adds a new path cost to the unit's database, the incrementing of the last change ID, stage 77 and the changing of the fabric state to unstable. The DSPF unit will be triggered to send packets, stage 74. The fabric unit resend timer will be restarted, stage 75. Even if the old and new path costs are the same, the DSPF unit packets will be sent, stage 74 and the fabric unit resend timer will be restarted, stage 75.

If the link is 'up', as a result of the check done in stage 71, the DSPF partner send will be activated, stage 79, and the fabric partner resend timer will be restarted, stage 80.

Thus, even if the link state change does not immediately result in a path cost change, the link change may result in a fabric reconfiguration change later. If a new link is gained a DSPF partner packet will be sent to the partner so that the partner unit can determine to whom they are connected.

In any event, as shown in FIG. 7 regardless of the checking of the link and the computation about the new path cost, a DSPF unit packet will always be sent to all the other fabric units so that any changes are broadcast. Even if there is no local change there may be a change elsewhere in the fabric. If a DSPF unit packet that results in no changes is produced, the packet will be in effect swallowed by the intermediate partners.

Processing of Incoming DSPF Unit Packets

FIG. 8 is a flow chart which illustrates the processing by a unit of incoming DSPF packets. Part of FIG. 8 is expanded as FIG. 9.

The receive processing flow chart commences from a start 81, when the packet is received. Stage 82 is a check on the validity of the received port state. If the receive port state is invalid, the packet is discarded, stage 833. Validity of the port state may be determined according to a variety of criteria. The port may not be a fabric port; the port may be disabled and so on.

If the port state is valid, there is a validation stage for the incoming DSPF packet. This is shown generically by stage 84.

If the source address of the packet is that of the self same unit, then the packet is ignored. The receiving port would be set into a loop-back state.

Before the packet is authenticated, the sequence number of the packet will be checked against the last sequence number seen from the MAC address of the transmitting unit. If this is the first packet from the unit, then the packet will be processed. If the packet is successfully processed, including passing the authentication test, the new sequence number will be noted against the MAC address of the transmitting unit. If the sequence number is less than or equal to the previous sequence number, then the packet will be ignored because it will have already been processed.

If the sequence number is greater than the previous sequence number seen then the packet will be processed. If the packet is successfully processed, including the passing of the authentication stage, the new sequence number will be noted against the MAC address of the transmitting unit.

It will be observed that the omission of a packet in a sequence is normally not of any consequence. The information in the packets is automatically updated and it is only necessary to have the latest information for the correct updating of the fabric tables.

The unit needs to ensure that data is being received from a valid member of the fabric. Thus the authentication stage includes the checking of a password, the checking of the fabric name, the software version and the other authentication or type fields in the packet.

Then the connecting fabric port will be set into a 'bad partner' state (stage 85), causing a partner packet to be sent on this port. Any DSPF packets received on the link must not be allowed to alter the fabric unit table. The unit will continue to transmit, receive and check incoming DSPF unit and partner packets in case the transmitting unit is re-configured. It may be, as matters turn out, that the transmitting unit is acceptable. Then it can be allowed to change the fabric unit table.

Stage 86 is a stage for checking the entry for own unit. The unit is determining whether it is still a member of the fabric. It will no longer be a member of the fabric if the received MAC address for this unit's identification in the packet is different from the unit's own MAC address. If the MAC address indicated for the receiving unit in the received packet is different from the receiving unit's actual MAC address, as determined by the check made at stage 86, the MAC address for the receiving unit as indicated in the packet is checked, at stage 87. If that address is lower than the receiving unit's own address, then the receiving unit must leave the fabric. This is done dynamically by setting all the fabric ports of the unit into the 'bad partner' state, stage 88. Partner packets will be sent on all ports. They will stay in this state until the other unit must be forced from the fabric. If the MAC address is higher, there will be a change to the unit table, stage 90.

If the packet is acceptable, the received fabric unit resend time and fabric partner resend time are checked. If a different value timer is received, and the timer source unit has a lower unit ID, then this unit will change its timer settings to the received settings and store the new values in PDS. This will cause this unit's own lastChangeId to change, and thus the fabric unit table will change. If the packet is acceptable, the fabric unit table is updated (stage 92). The records for each unit in the DSPF packet are processed as follows:

If the record is for this unit, it will have already been checked that it contains the correct MAC address. In this case, the remaining information should correspond to what is stored for this unit's fabric unit table record. If the other unit has the wrong information, then a fabric unit table change is flagged. One exception to this is when the lastChangeId being received is higher than our own, in which case update our own lastChangeId.

The last change identifier must be checked for the records of the other units. If there is already a higher or similar ID, then the record is ignored and the next record is checked (stage 91). Otherwise, the new data is stored (stage 92) and a fabric unit table change is flagged (stage 93). The latest change identifier in both the unit's entry, and in the unit's own received last change identifier list is stored. This will cause a fabric unit table change.

If after the last entry has been checked (stage 94) a fabric unit table change has been flagged (stage 95) then the transmission process is triggered to run (stage 96). This will pass the change on to the other units in the fabric and force the configuration of each unit in the fabric to be recalculated.

A unit should also send a unit DSPF in reply to a unit packet that contains information about fewer units than the unit itself is currently aware of, or if all of the received data is out of date. This is to cover the case where some of the units may not have a complete fabric unit table yet.

The fabric unit resend time is restarted (stage 97) and when it times out the fabric state is checked (stage 98).

As well as updating the fabric unit table, received unit packets can also cause a change in the fabric state. This state change is evaluated once the received unit packet has updated the fabric unit table, as shown in FIG. 9.

Figure 9:
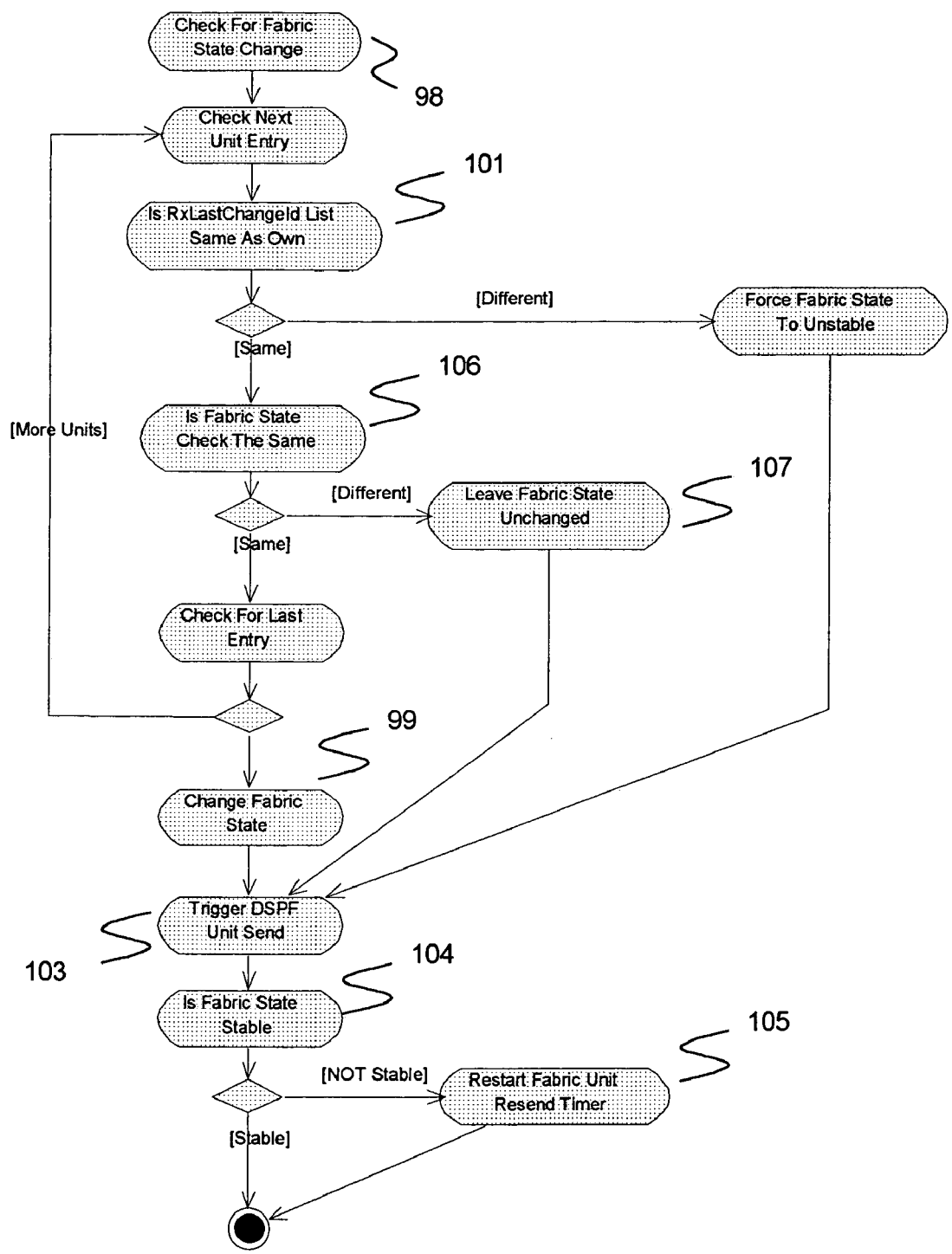
FIG. 9 is a flowchart extending FIG. 8

FIG. 9 illustrates the stages mainly between stage 98 ('check for fabric state change') and stage 99 ('change fabric state') in FIG. 8. The next unit entry is checked (stage 100). The list of received 'last change identifiers' for that unit is checked (stage 101). If it has changed the fabric state is forced to 'unstable' (stage 102) and DSPF packets are sent (stage 103). If the fabric state is then stable (stage 104) the process ends. If the fabric state is unstable, the fabric unit resend timer is restarted (stage 105).

If the check of the list of received last change identifiers (stage 101) has not changed, the fabric state is checked (stage 106). If it is different from before it is left unchanged (stage 107) and DSPF packets are sent (stage 103). If the fabric state had not changed, there is a check for the last entry (stage 108). The check of the lists of received last change identifiers repeats until the last entry has been checked.

Table 5 shows the evaluation of the change in the fabric state.

TABLE 5

| Current Fabric State | Condition | Next Fabric State |
| --- | --- | --- |
| Unstable | All received last change ID lists for all known units match. | ready |
| Ready | Received fabric state is ready for all known units | configured |
| configured | Received fabric state is configured for all known units | stable |

Should the unit's fabric unit state change, this will be treated as a change in the fabric unit table—even though the lastChangeId does not change and the fabric is not in the unstable state. A unit DSPF will be immediately triggered whenever the unit changes its fabric state.

If the fabric enters the configured state, the unit will run its SPF calculation. It will calculate the new fabric links and assign new port states based on the new calculation. Note that none of the links will be brought into use for higher layers until the unit enters the stable state.

Should the SPF calculation result in a unit being isolated from the fabric, the record for that unit will then be deleted. This will cause this unit's lastChangeId to be incremented. At this point, the fabric must change to the unstable state, and begin recalculating the fabric connections again.

Processing of Incoming DSPF Partner Packets

Figure 10:
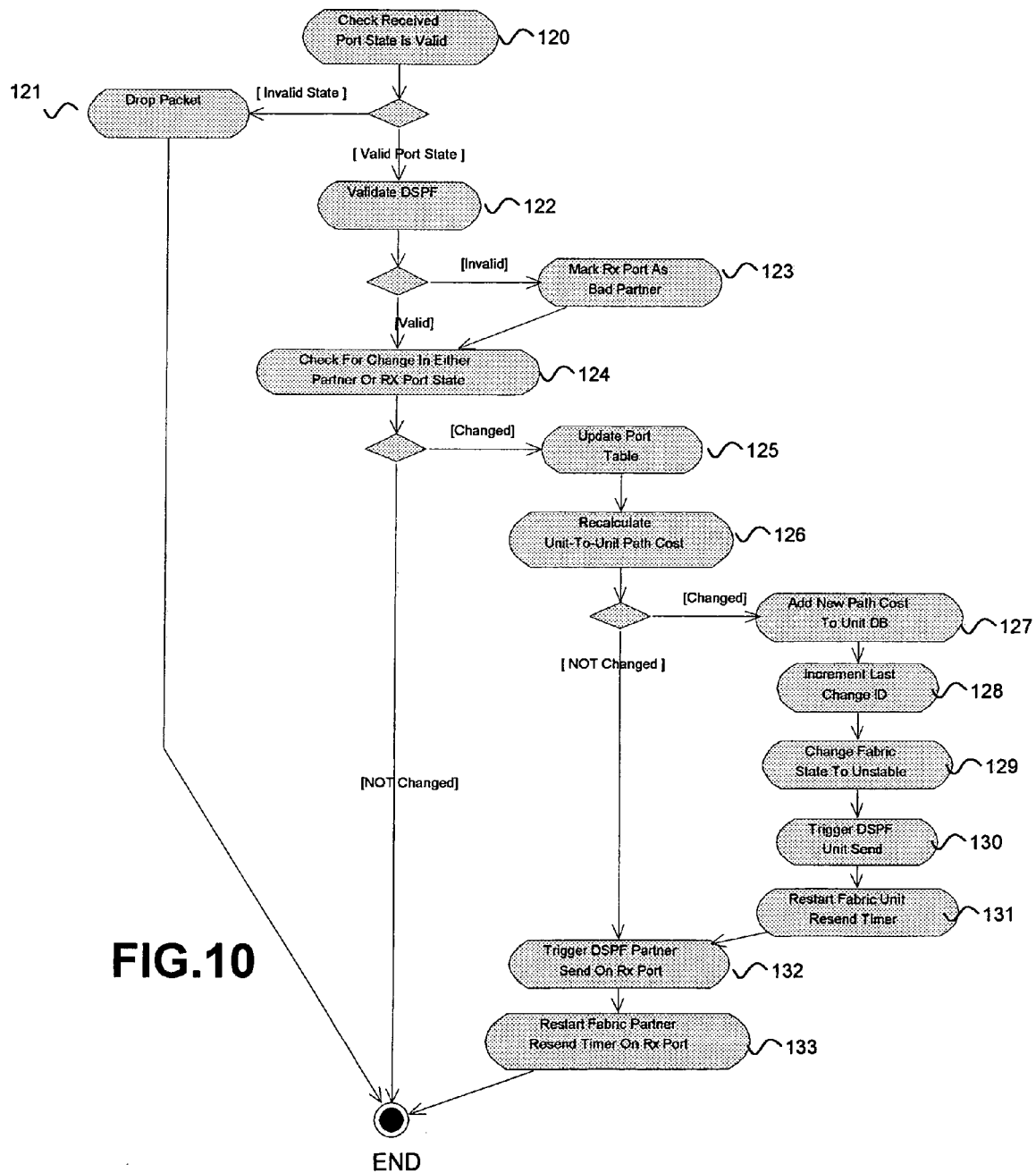
FIG. 10 is a flowchart for processing partner packets.

FIG. 10 is a flow chart of the receiving process for 'partner' packets.

DSPF partner packets may be received at any time, regardless of the state of the fabric. Stage 120 indicates a validity check on the state of the port at which the packet has been received. The criteria of validity preferably correspond to those discussed with reference to FIG. 8. If the port state is invalid, the packet is discarded (stage 121). If the port's state is valid, the validity of the packet is checked (stage 122), as discussed earlier with reference to FIG. 7. If the packet is invalid, the port is marked as having a 'bad partner' (stage 123).

If the source address of the DSPF packet is that of the receiving unit, then any incoming DSPF partner packets are ignored: the receiving port is set into the loop-back state. If the receiving port is different from the transmit port, then the transmit port is also set into the loopback state.

The unit must ensure that the data is being received from a valid member of this fabric.

This (in this specific example) includes validating the authentication type and performing the password or MD5 check if required; checking the fabric name; and checking the unit already exists in the fabric unit table by checking its MAC address against the one stored against its unit ID.

If the packet passes the validity check at stage 122, there is a check for a change in either the partners port state or the receiving port state (stage 124). Any change will update the port table (stage 125) and cause a recalculating of the unit-to-unit path cost (stage 126). If there be no change to the path cost, a DSPF partner packet is sent from the port (stage 132) and the fabric partner resend timer is restarted (stage 133).

If the path cost changes, the new path cost will be entered into the unit's database (stage 127). The last change ID will be incremented (stage 128) and the 'fabric state' will be changed to unstable (stage 129). A DSPF packet will be sent (stage 130); the fabric unit resend timer will be restarted (stage 131); and a DSPF partner packet will be sent (stage 132).

If the partner packet is acceptable (i.e. it comes from a known unit), and the received port state was badPartner, then the received port's state can be changed to goodPartner. This will cause a DSPF partner packet to be sent. Note that if the badPartner state was due to a duplicate unit ID, then the unit table will have had to be updated by a previous unit packet to remove this condition before the partner packets could have been received successfully. Only received partner packets can move a port from the badPartner state, because received unit packets are received from several ports simultaneously with the same sequence number, so only the first port would be cleared. A partner packet will be sent to each of the interconnecting ports, so it can clear each port independently.

Example of 'Change' Propagation

Figure 11:
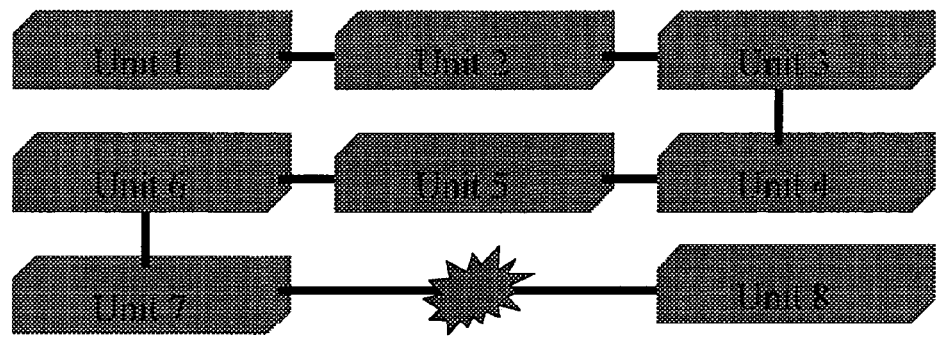
FIG. 11 illustrates a switch fabric

There follows an example of the propagation of a change through a fabric, with reference to the fabric shown in FIG. 11.

At time t=0 the link between units 7 and 8 fails. Unit 7 immediately informs (using the protocol distributed herein) unit 6. After a short while, unit 6 informs unit 5. Then unit 5 informs unit 4 and so on the rate of propagation depends on how quickly units can process DSPF packets. As each unit learns about the link loss, it will block every local fabric link to user traffic.

At some later time $t_1$, all of the units have the same information, so no more unit DSPFs are exchanged. All units know that all the received last change identifier lists are identical. The units can each enter the ready state, causing another (short) exchange of unit DSPFs.

At time $t_1+\Delta t$, as a result of each unit entering the ready state, each unit can then enter the configured state.

At time $t+\Delta t$, unit 7 will perform its fabric configuration calculation (as described later) and determines that it can no longer use its connection to unit 8. Note that the failure of the link has probably already shut this link down. Shortly after, unit 6 will do its recalculation and determine that it can no longer reach unit 8 by way of unit 7. The recalculation proceeds through the units to unit 1. There is then another short exchange of unit DSPFs.

At time $t_1+2\Delta t$, all units have been configured. The units can each enter the stable state, causing them to unblock their local fabric links to management traffic. Only 'good' links are unblocked.

At time $t_1+2\Delta t+t_2$, the management agent will unblock the local fabric links to user traffic. This time depends on whether the new fabric topology affects the network topology.

In practice the whole fabric can recover from the change for the next level of operation within 500 milliseconds. How long the recovery takes depends upon what other applications are being run on the units' processors at the crucial time.

DSPF Mis-configuration Issues

Fabric Ports Connected by Another Switch

A fabric port could be accidentally connected to a normal port on another switch. This means that the DSPF multicasts are being sent out of the fabric port and treated as normal multicasts by the next switch and flooded around the network. Mostly this is wasteful flooding and is simply noise.

There is only one situation where this can cause any harm; that is where there is another fabric port from a different unit in the same fabric also connected to a normal port. In this case the two ports will recognise each other and assume that the link is another direct link between the units. This is probably only a problem when the interconnecting device is a managed switch that could reconfigure the link using a protocol such as LACP.

Figure 12:
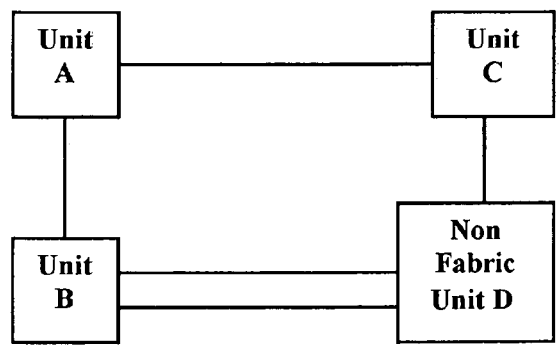
FIG. 12 illustrates an interconnect via a non-fabric unit

In some cases, the non-fabric unit may be detected via loopback. For example, in FIG. 12, when unit B sends a DSPF packet down one of the links to the non-fabric unit D, the non-fabric unit D will flood the DSPF packet back to unit B via the other link. Thus unit B can detect the non-fabric unit by receiving its own DSPF frames, and setting the ports into loopback.

However, if there were only one link between unit B and the non-fabric unit, then the DSPF packets would flood in such a way that unit B would think it was directly connected to unit C.

If it be necessary to cope with this special case, the devices implementing the DSPF protocol could detect if (for example) an IEEE reserved multicast frame is received from a fabric port at any time. If such a frame were received, the port could be marked as having a 'badPort'.

Poor Connectivity on Fabric Port

There may be some circumstances where the hardware used to interconnect two fabric ports is faulty.

If the throughput of the interconnect is poor owing for example to noise, then some frames will be lost. The loss will be detected when the last change identifier lists are checked after the unit resend timer expires.

If the interconnect is faulty in one direction, then one end will not be receiving DSPF multicasts when the other is. The end that is not receiving could, after some arbitrary number of partner resend intervals, enter a 'noPartner' state. The end that is transmitting would see this change of state and must immediately set itself to a 'badPort' state.

Special Use of Protocol

It was remarked earlier that there were two broad aspects to the protocol employed in the present invention. One of them, preferably employing the DSPF packets, unit and port tables and state machines previously described, is mainly concerned with the detection of events that affect the switching fabric, the propagation of consequential information to the units in the fabric, the use of the last change identifier for a variety of purposes including a controlled shut down, the initiation of recovery and the detection of recovery and so on. Another aspect is the computation of routes having regard to path costs, multiple paths and possible load balancing in a general switching fabric which may be in the form of a complex mesh. The second aspect of the invention is particularly useful in relation to switching fabrics of the general kind shown in FIG. 1 and later in relation to FIGS. 23 to 29. However, the invention, particularly the first aspect thereof, is applicable to switching fabrics of the kind shown in FIG. 2, particularly connected by an ordinary cascade connection, called herein 'hard' fabric link, and wherein there are topological variations such as the omission of one or more of the fabric units and/or the provision of configurable links between the units. Examples of these are set out in the sections that follow.

Figure 13:
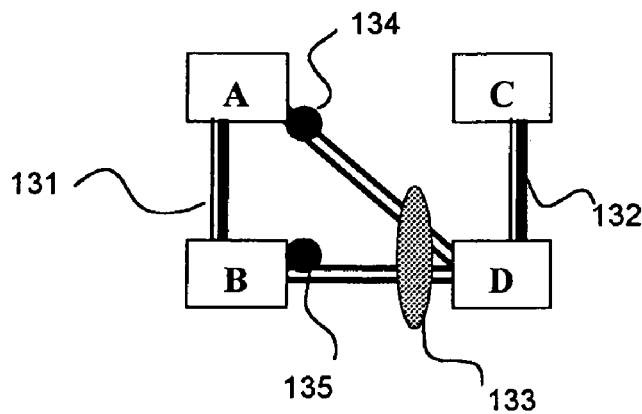
FIG. 13 illustrates one form of mesh

FIG. 13 illustrates one example of the specific configurations possible. In this example there a four units A, B, C and D, A and B being connected by a 'hard' fabric link 131, units C and D being connected by a hard fabric link 132 and a trunk connection 133 merging soft fabric links from A and B to unit D. The dots 134 and 135 represent the enabling in the respective unit of 'local forwarding' for the trunk.

The unit that is determining its configuration is always termed unit A. The unit to which it is (or would be) connected by a hard fabric link is termed unit B. The other units are C and D.

The various topologies are described using the following diagrams.

Each unit will treat itself as being unit A. The mappings between the unit numbers 1/2/3/4 and the A/B/C/D designation for each unit may be as shown in Table 6.

TABLE 6

| As seen by: | A | B | C | D |
|---|---|---|---|---|
| Unit 1 | 1 | 2 | 3 | 4 |
| Unit 2 | 2 | 1 | 3 | 4 |
| Unit 3 | 3 | 4 | 1 | 2 |
| Unit 4 | 4 | 3 | 1 | 2 |

The above table is worked out on the basis for all possible combinations, the mapping is equivalent when each unit applies the notation to itself.

There are six potential connections in a fabric: A-B, A-C, A-D, B-C, B-D and C-D.

The data from the fabric unit table is used to determine if these connections are 'up(1)' or 'down(0)'.

The fabric unit table provides two path costs for the connections between adjacent units. For this kind of fabric one is only interested in knowing if the path exists. There are two path costs because there are two ends of each connection and the two ends may not agree on the path cost. For instance, one end may have indicated that the link has failed but the other end may not have done so yet. If only one end indicates that the link is down, the link is treated as being down and will not be used for network traffic.

A 6-bit value (in this specific example) is created from the six values for A-B, A-C, A-D, B-C, B-D and C-D. This 6-bit value is called the TopologyID. The TopologyID value describes every possible fabric from unit-A's point of view. Each unit calculates its own value—from its own point of view.

The TopologyID is used to index into a Topology Table which contains 64 entries that define how the ASIC and fabric links should be configured for each topology. This table can be calculated ad hoc or may be coded into the software. There is a column in the table for each configuration parameter that is dependent on the fabric topology.

Some examples are shown in the simplified Table 7.

Figure 14:
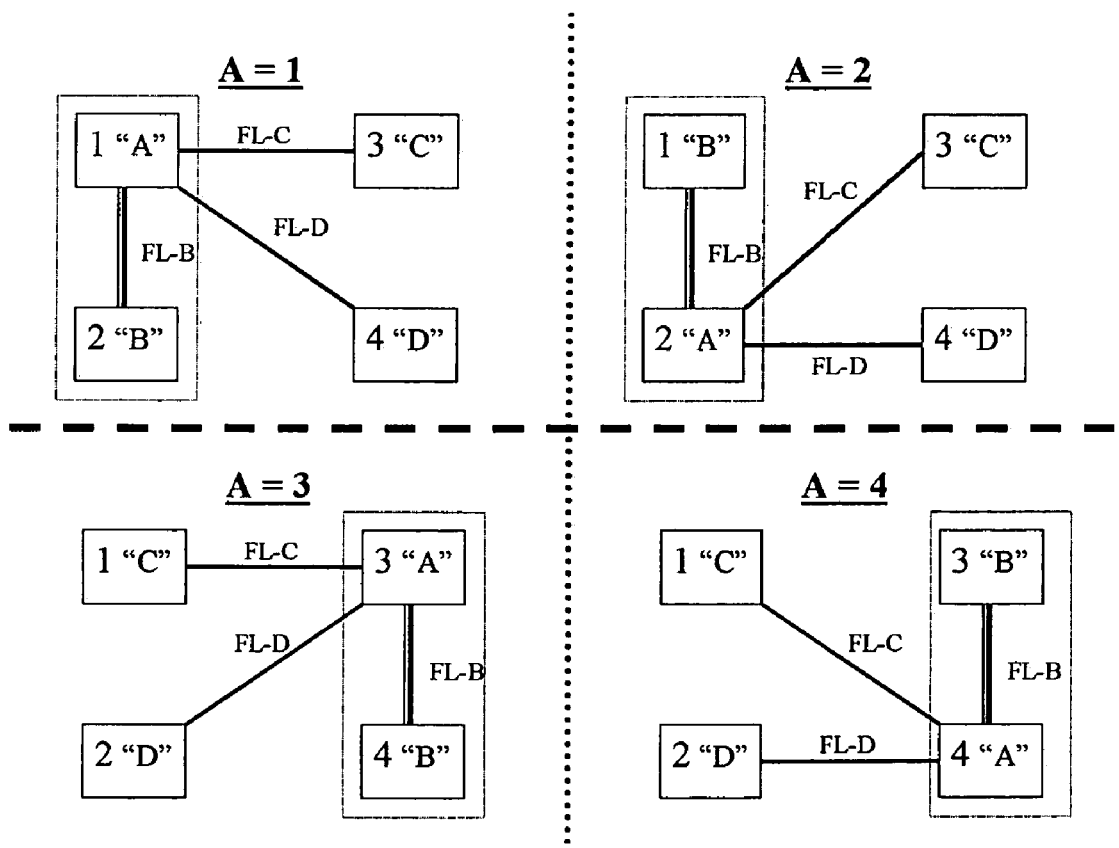
FIG. 14 illustrates different localized topologies of a mesh.

FIG. 14 refers to a full 4-unit mesh; each sub-diagram represents each unit's 'perspective' of the fabric. Consider the top half of the Figure first On this side, FL-B is a hard link. So it is known that both unit 1 and unit 2 will be using FL-B's trunk ID as the hard link. It is also known that both unit 1 and unit 2 will be using FL-C to reach unit 3 and FL-D to reach unit 4. So all the ports to unit 3 from the unit 1/2 side use the same trunk ID, FL-C. The same applies for all the ports to unit 4.

Now consider the bottom half of the diagram. On this side, FL-B is still a hard link The link between units 1 and 2 and units 3 and 4 are soft links, so we can re-use the same trunk IDs for this half of the fabric. It is known that both unit 3 and unit 4 will be using FL-B's trunk ID as the hard link. It is also known that both unit 3 and unit 4 will be using FL-C to reach unit 2 and FL-D to reach unit 3. So all the ports to unit 2 from the unit 3/4 side use the same trunk ID, FL-C. The same applies for all the ports to unit 4.

Thus it can be seen that labelling A, B, C, D the units in this manner means that the trunk IDs automatically work themselves out when the unit uses this method to form its own localized view of the topology. There are then some simple, local, rules about which ports go into which trunk, and how the trunks are configured.

Fabric Link Configuration

Summary

Each unit needs to configure its own ASICs. In order to do this, it needs to obtain a view of the fabric from its own position in the fabric. The TopologyID described above gives unit A that view.

Unit A has only three potential fabric links to configure. It should be remembered that a fabric link is a trunk of one or more fabric ports.

Fabric Link B (FL-B) is the fabric link to unit B.

Fabric Link C (FL-C) is the fabric link to unit C. This could be merged with FL-D.

Fabric Link D (FL-D) is the fabric link to unit D. It will be used only when C and D have no hard fabric link.

Each fabric link may reserve one hardware trunk.

FL-C and FL-D must be merged into one link if the fabric link C-D also exists.

TABLE 7

| TopologyID | A-B | A-C | A-D | B-C | B-D | C-D | Description |
|---|---|---|---|---|---|---|---|
| 0-7 | 0 | 0 | 0 | x | x | X | Unit A is on its own. From A's point of view, no fabric exists. |
| 8 | 0 | 0 | 1 | 0 | 0 | 0 | 2unit fabric A-D |
| 16 | 0 | 1 | 0 | 0 | 0 | 0 | 2unit fabric A-C |
| 32 | 1 | 0 | 0 | 0 | 0 | 0 | 2unit fabric A-B |
|  | 1 | 0 | 1 | 0 | 1 | 0 | 3unit loop A-B-D |
|  | 1 | 1 | 0 | 1 | 0 | 0 | 3unit loop A-B-C |
|  | 1 | 1 | 0 | 1 | 0 | 1 | 4unit loop A-B-C-D |
|  | 1 | 1 | 0 | 0 | 1 | 1 | 4unit loop A-B-D-C |
| 63 | 1 | 1 | 1 | 1 | 1 | 1 | Full mesh of 4 units |

This table shows a few examples.

Explanation of Localized Topologies

Consider a 4-unit full mesh, and split out the connections between each unit and its neighbours. Give each unit a letter as defined in Table 7. Then label the links between A and B as FL-B, A and C as FL-C and A and D as FL-D, and give all the ports in each link label their own trunk ID.

Local forwarding would never be provided on FL-B. FL-B only ever connects unit A to unit B so there is never a need for local forwarding.

Local forwarding can be enabled on FL-C if (a) units A and B are directly connected and (b) both unit A and unit B have at least one connection to unit C (including being connected via unit D). Thus if connections A-C and A-D are both down, local forwarding cannot be enabled. Similarly, if both connections B-C and B-D are down, local forwarding cannot be enabled.

Local forwarding can only be enabled on FL-D if (a) units A and B are directly connected, (b) both unit A and unit B have at least one connection to unit D (including being connected via unit C) and (c) FL-D has not been merged with FL-C.

Each physical port is added to one of these three fabric links, depending upon which unit is at the other end of the link—i.e. its PartnerUnitID. This information can be found in the FabricPortTable and be determined from the incoming DSPF partner packets.

Examples of Fabrics

Figure 15:
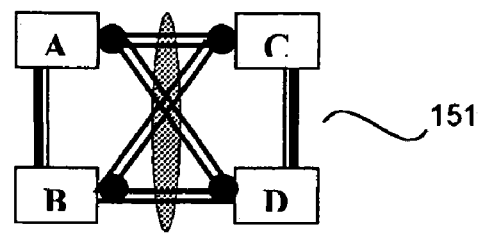
FIG. 15 illustrates different fabrics
Figure 15:
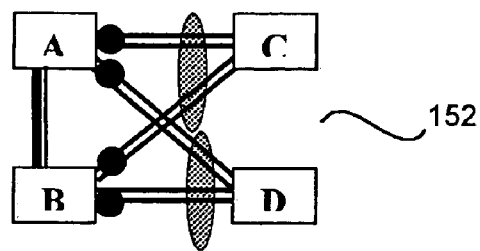
Figure 15:
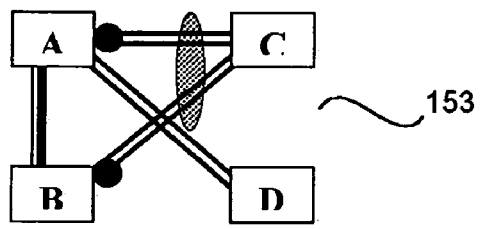
Figure 15:
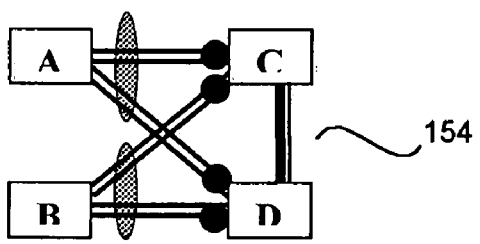
Figure 15:
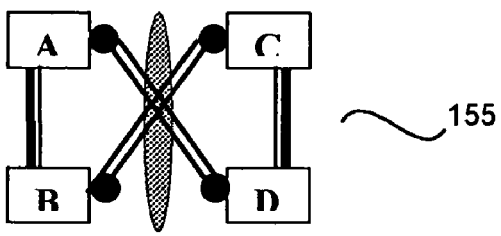

FIG. 15 illustrates some switching fabrics of this type.

Fabric 151 having a Topology ID of 63 is the full mesh. Unit A has a hard fabric link with unit B, as does unit C with unit D. The links FL-C and FL-D can be joined into a single aggregation. The link FL-D is not used. Local Forwarding is enabled on FL-C, because unit B also has links to units C and D.

Fabric 152, having a Topology ID of 62 shows the previous example but with links CD failed. Because there is no hard fabric link between unit C and unit D, links FL-C and FL-D cannot be merged. They must be treated separately. Local Forwarding is enabled on FL-C, because unit B also has links to units C. Local Forwarding is enabled on FL-D, because unit B also has links to units D.

Fabric 153, having a Topology ID of 60 is as fabric 151 but with links C-D, B-D failed Because there is no hard fabric link between unit C and unit D, FL-C and FL-D cannot be merged. They must be treated separately. Local Forwarding is enabled on FL-C, because unit B also has links to units C. Local Forwarding cannot be used on FL-D because unit B needs to send traffic to unit D via unit A.

Fabric 154, having a Topology ID of 31 has link A-B failed. FL-B is not used.

Because there is a hard fabric link between unit C and unit D, FL-C and FL-D can be merged into a single aggregation. FL-D is not used. Local Forwarding cannot be used on either FL-C or FL-D because there is no hard link from unit A to unit B.

Fabric 155, having a Topology ID of 45 shows links A-C, B-D failed. Unit A has a hard fabric link with unit B, as does unit C with unit D. FL-C and FL-D can be joined into a single aggregation. FL-D is not used, and any links to unit D are put into FL-C. Local Forwarding is enabled on FL-C, because unit B also has links to the unit C/D pair, and is using FL-C to reach them.

Topology Table

Based on all the combinations, we can build up a 'Topology Table' as shown in Table 8. This has a row for each of the 64 possibilities. The columns FL-B, FL-C and FL-D each contain an 8-bit value to indicate what to do with the Fabric Link and its associated ports.

Bit 0: 0 means 'block all the ports and do not receive or transmit anything but DSPF protocol packets'.

Bit 1: 1 if unit B is accessed via this Fabric Link, else 0.

Bit 2: 1 if unit C is accessed via this Fabric Link, else 0.

Bit 3: 1 if unit D is accessed via this Fabric Link, else 0.

Bit 4: 1 if need to enable local forwarding on this Fabric Link, else 0=disable.

Bit 5: 1 if need to merge FL-C and FL-D, else 0.

Bits 1, 2, 3 are used to provide the AccessedUnits MIB object in the FabricPortTable.

TABLE 8

| TopologyID | A-B | A-C | A-D | B-C | B-D | C-D | Description | FL-B | FL-C | FL-D |
|---|---|---|---|---|---|---|---|---|---|---|
| 0-7 | 0 | 0 | 0 | x | x | x | lonely | Block | Block | Block |
| 8 | 0 | 0 | 1 | 0 | 0 | 0 | 2 unit fabric A-D | Block | Block | D |
| 16 | 0 | 1 | 0 | 0 | 0 | 0 | 2 unit fabric A-C | Block | C | Block |
| 32 | 1 | 0 | 0 | 0 | 0 | 0 | 2 unit fabric A-B | B | Block | Block |
| 24 | 0 | 1 | 1 | 0 | 0 | 0 | 3 unit fabric A-C, A-D no hard fabric links | Block | C | D |
| 25 | 0 | 1 | 1 | 0 | 0 | 1 | 3 unit triangle A-C-D | Block | C, D, Merge | Block |
| 42 | 1 | 0 | 1 | 0 | 1 | 0 | 3 unit triangle A-B-D | B | Block | D, Local-Fwd |
| 31 | 0 | 1 | 1 | 1 | 1 | 1 | Example #4 | Block | B, C, D, Merge | Block |
| 50 | 1 | 1 | 0 | 0 | 1 | 0 | 4 unit fabric 1 hard fabric link | B, D | C | Block |
| 51 | 1 | 1 | 0 | 0 | 1 | 1 | 4 unit square A-B-D-C | B | C, D, Local-Fwd | Block |
| 60 | 1 | 1 | 1 | 1 | 0 | 0 | Fabric 153 | B | C, Local-Fwd | D |
| 62 | 1 | 1 | 1 | 1 | 1 | 0 | Fabric 152 | B | C, Local-Fwd | D, Local-Fwd |

TABLE 8-continued

| TopologyID | A-B | A-C | A-D | B-C | B-D | C-D | Description | FL-B | FL-C | FL-D |
|---|---|---|---|---|---|---|---|---|---|---|
| 63 | 1 | 1 | 1 | 1 | 1 | 1 | Full mesh of 4 units | B | C, D, Local-Fwd, Merge | Block |

Figure 16:
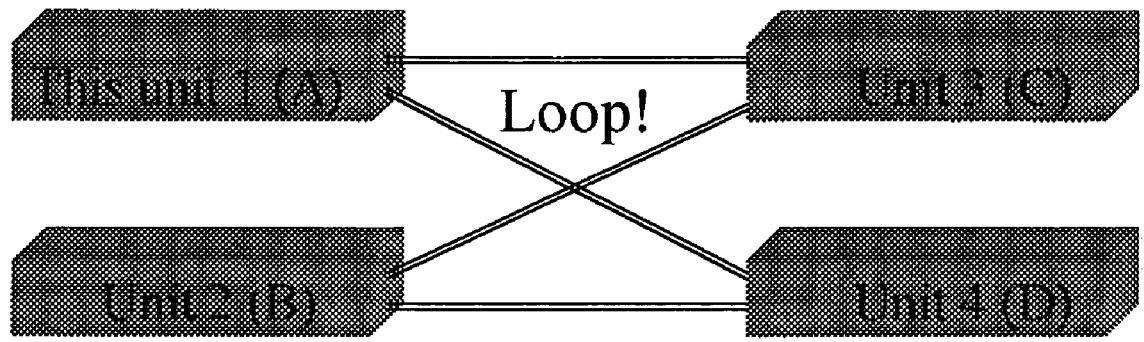
FIG. 16 is a diagram illustrating the existence of a loop.

There is one special configuration, which is shown in FIG. 16. If both of the hard fabric links have failed (or are not present) then there is a potential loop. It is arbitrary which link is broken, so it is presumed that the link between units 1 and 4 is broken in this case. By breaking the link, it is meant that the link will not be placed into the forwarding mode. DSPF partner and unit packets will continue to be sent over this link.

The most important distinguishing feature of the various topologies is whether the hard fabric links are present or not. These are the links unitA-to-unitB and unitC-to-unitD. The TopologyID value describes every possible fabric from unit-A's point of view. Each unit calculates its own value from its own point of view.

In the four-unit example given which two units are connected by the 'hard' fabric link is a matter of arbitrary choice. It is important that each unit has only one 'hard' fabric link connection.

SPF Algorithm

The algorithm for the fabrics just described preferably proceeds as follows.

When the DSPF protocol detects a change in the fabric unit table, it floods the change to all units in the fabric as previously described. When the unit's fabric state transitions from the ready state to the configured state it starts the topology reconfiguration.

A new TopologyID is calculated based on the information in the fabric unit table The path costs transmitted in the unit DSPF are simple fabric link values. A path cost of "1" is sent when the fabric link is up, regardless of speed, duplex state or trunk information. A path cost of "0" is sent when the fabric link is down. Unlike the algorithm described later, note there are next hop calculations; each link is a physical point-to-point calculation.

The TopologyID is used to index into the Topology Table and the three fabric links are re-configured accordingly.

Each fabric port needs to be assigned to one of the three cascade trunks. The trunk is selected based on the partnerUnitID and the TopologyID.

If a port is the first port in the trunk, then it becomes the master port for that trunk on the unit.

The ports are configured in the ASIC as rx-only member of a trunk regardless of their port speed. There is no advantage in blocking any of the ports on the basis of speed.

Traffic may be accepted from any port, even the ones running at different speeds. This also avoids the need for both units to agree on which ports will be used for transmit.

All the ports connected to FL-B must also be configured as ASIC cascade ports.

At some stage a goodPartner( ) port should be moved to the RxTraffic(10) state.

Now one needs to sort out the ports for tx (this is similar to the Attach Algorithm in Link Aggregation).

For each Fabric Link FL-B, FL-C and FL-D.

Examine all the ports in that fabric link that are goodPartner( ), RxTraffic(10) or TxAndRxTraffic(11).

Choose up to four ports with the same lowest path cost and configure these as transmit ports for the trunk. The chosen ports are moved into the TxAndRxTraffic(11). The non-chosen ports are moved to RxTraffic(10).

It is desirable to select the fastest ports for transmission. The transmission ports are always local. The only aggregations that span more than one unit will always be in local forwarding mode if they have ports in both units. So, for each unit one selects the fastest ports and program them for transmission.

Figure 17:
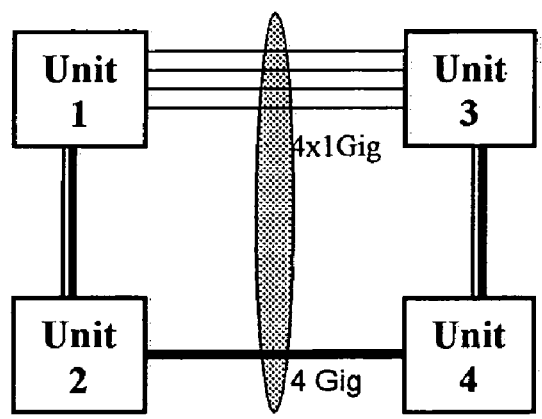
FIG. 17 is a schematic diagram illustrating fabric aggregation.

This SPF algorithm is done independently on all units. Therefore, there exists a situation shown in FIG. 17 where (for example) the paths from unit 1 to units 3 and 4 are 1 Gb/s and the paths from unit 2 to units 3 and 4 are 4 Gb/s.

This algorithm will enable transmission on the 1 Gb/s and the 4 Gb/s links. Normal Link Aggregation would not allow this.

As previously indicated, the protocol described is particularly suitable for use in the configuration and control of a switching fabric wherein the units allow considerable topographic freedom, for example systems and units described in prior co-pending applications for Donoghue et al Ser. No. 10/067,738 filed 8 Feb. 2002, or O'Neill et al, supra. The former of these describes 'source-routing' wherein the unit that, within the switching fabric, first receives a packet and determines, for the packet employing an identification scheme common to all the units in the fabric, an egress port and egress unit from the switching fabric. For this purpose packets within the switching fabric include a special header which identifiers the ingress unit and port and the egress unit and port. O'Neill et al. describe the cooperation of such a header with a routing database for the control of the routes of packets within the database and the dynamic suppression of closed loops. The protocol described herein can be employed to establish such a database for routers within the cascade and for various other purposes.

Even so, the protocol and the other features of the invention are applicable more generally.

Desktop Stacking

Figure 18:
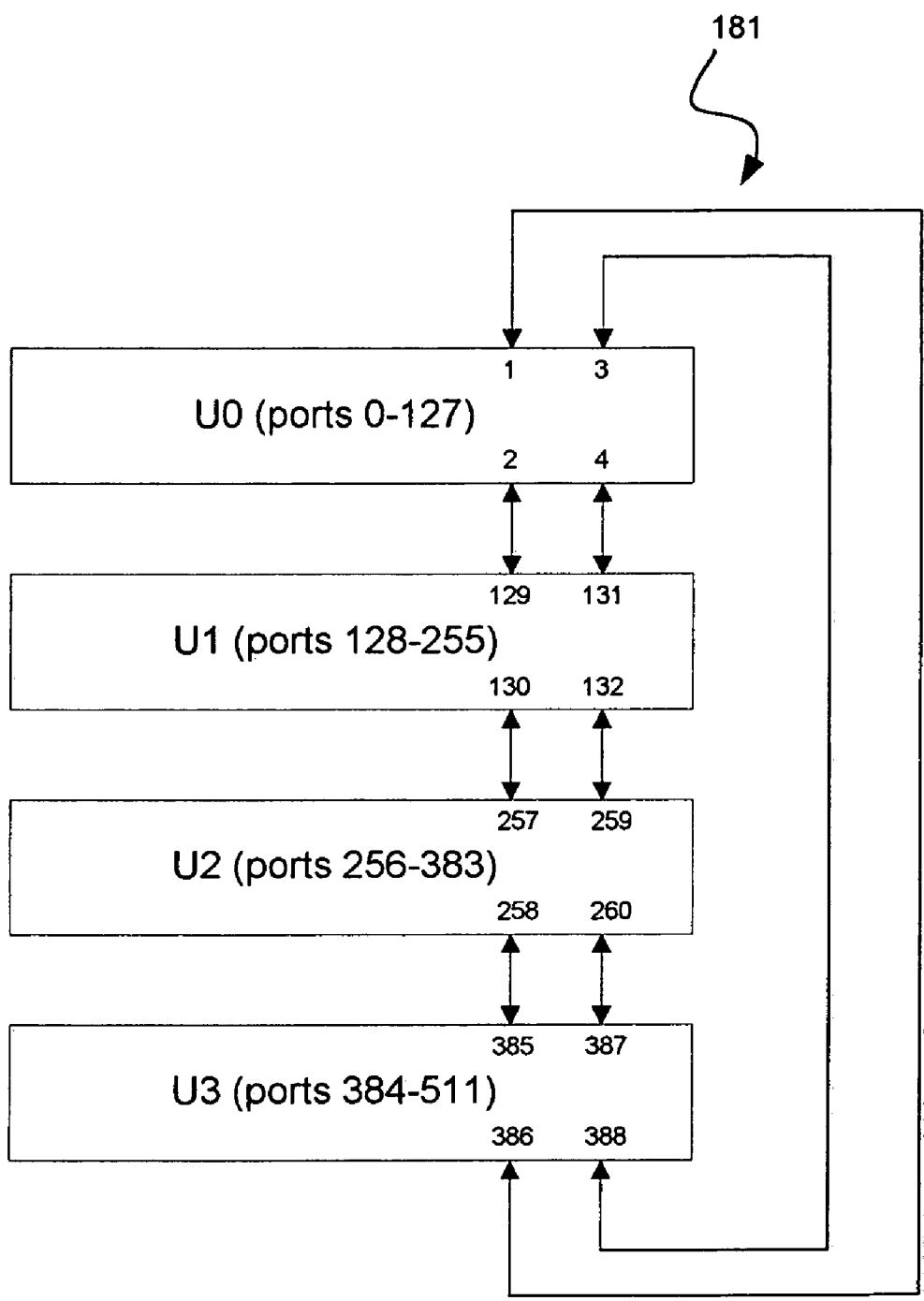
FIG. 18 schematically illustrates one form of cascade.

One cascade system with which the invention may be employed is shown in FIG. 18, wherein four switching units U0 to U3 has a dual cascade connection between 181 which may comprise two 2.5 Gb/s connections between each adjacent pair of units.

The system has provision for up to 128 ports per unit, the unit U0 having ports (either actual or potential) numbered 0-127, the units U1, U2 and U3 having respective ports numbered 128-255, 256-383 and 384-511 respectively. The cascade links are full duplex and are connected to corresponding ports on each switch.

The DSPF protocol determines the optimal route from each unit to the other units. In the example shown in FIG. 18 (or in any situation where a loop exists) all links may be used for known unicast traffic. The DSPF protocol is used to figure out the optimal route from any unit to each other unit. This represents most of the traffic in the network. In the case of multicast traffic, the DSPF protocol can also be used to break loops. An exception would be where two units are connected with two cascade cables. In this situation, the links may be set up as a single trunk. In a normal mode, the cascade would be set up to send multicast traffic on the "uplink" and the "downlink". The ASICs would be configured to receive multicast traffic from each other unit on a particular path only.

Other Fabric Examples

Figure 19:
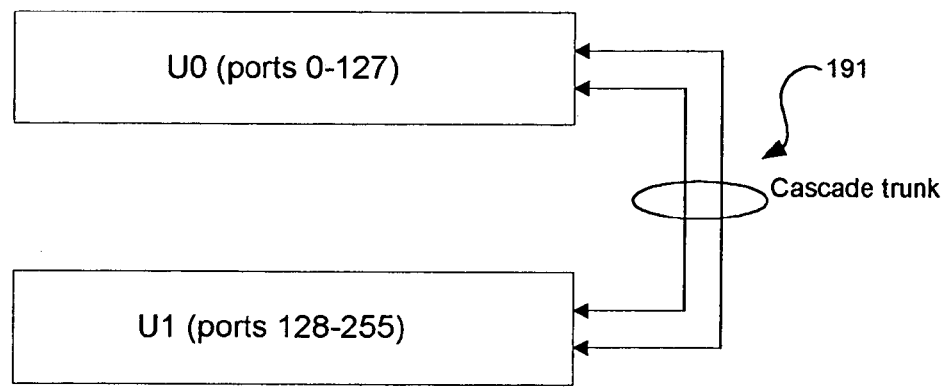
FIG. 19 illustrates a two-unit fabric.

FIG. 19 shows an example of a two-high fabric in a core switch composed of units U0 and U1 connected by a cascade trunk 191. Two 10 Gb/s slots per unit are shown interconnecting the two units, giving 20 Gb/s cascade bandwidth.

Figure 20:
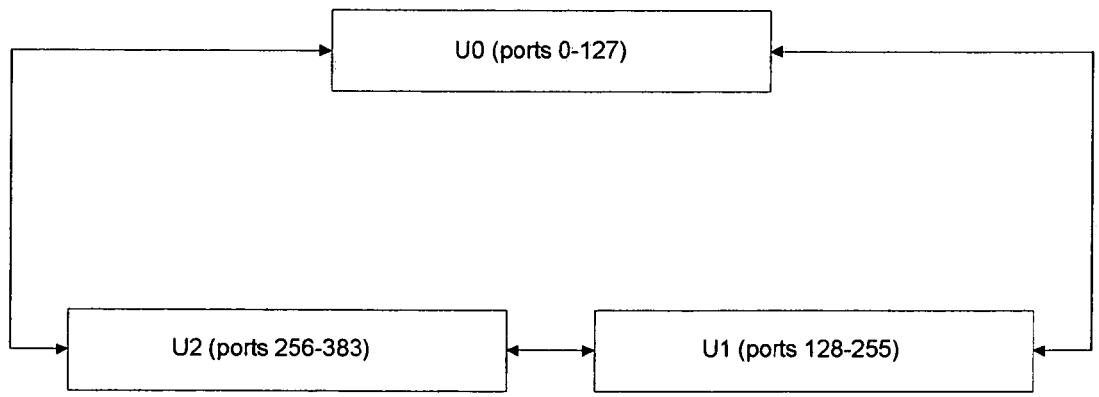
FIG. 20 illustrates a three-unit fabric.

FIG. 20 shows an example of a three-high fabric composed of units U0, U1 and U3. The difference between this and the 2 high fabric is that some of the cascade ingress ports would be disabled (using DSPF) from receiving multicast traffic. Known unicast traffic can still use all links. This is possible by way of the "source routing" forwarding algorithm for known addresses.

Figure 21:
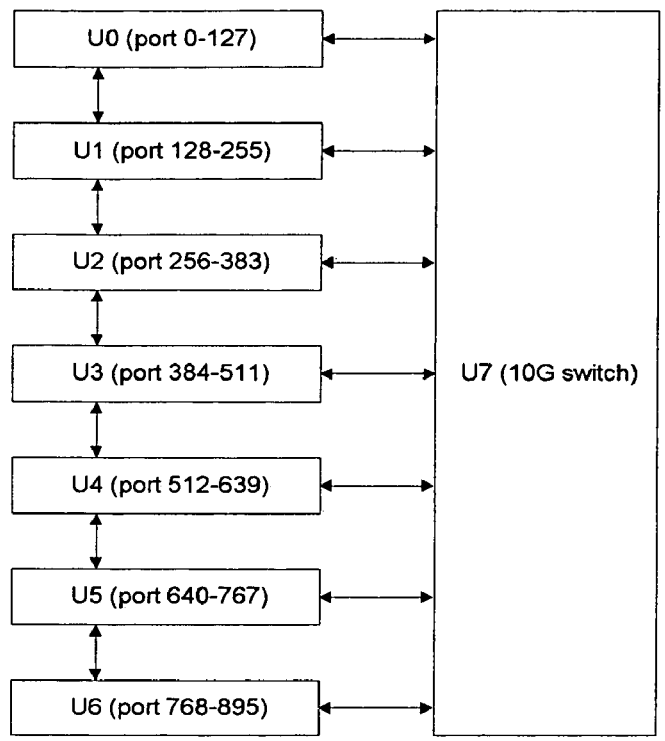
FIG. 21 illustrates another form of cascade.

FIG. 21 shows a stack of switches U0 to U7 for which a cascade is provided by a core switch U7. Each link to the switch U7 is assumed to be running in cascade mode. There are eight units in total supported in the stack, including the switch U7.

Resilience is provided in this example by the links between U0 and U1, U1 and U2 and so on.

Figure 22:
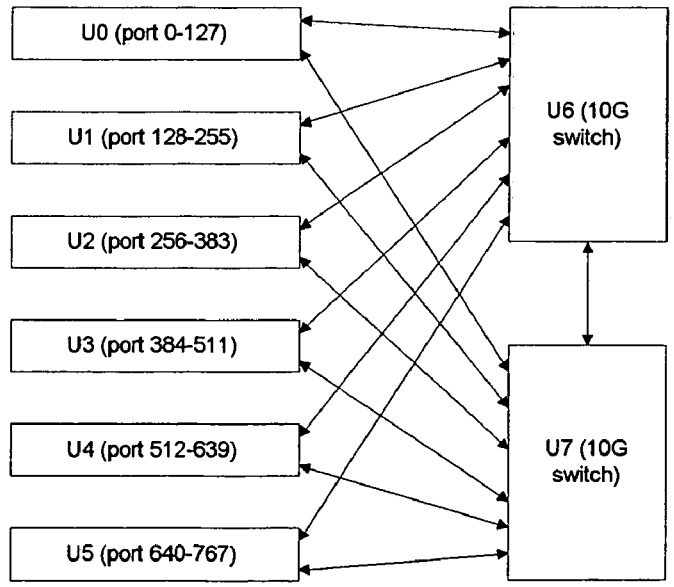
FIG. 22 illustrates another form of cascade.

FIG. 22 illustrates a six-high stack of units U0 to U5 in which switches U6 and U7 are employed as aggregators.

When the Initial Unit Knows the Destination Port

As noted above the protocol may be employed in a switching fabric that uses source routing to pass traffic from one unit to the another. An example is in a system as described in the aforementioned copending applications. When source routing is used in a fabric, and when there is only one destination (egress) port and that port identification is known, a packet is passed successively to units that are closer to the destination port until it arrives at the unit with the destination port. The packet traverses a single link at a time and always heads towards the outgoing port. It thus never loops in the fabric. However there may be multiple paths between the units. The DSPF protocol may be used to determine which path is the best path for transmission to any other unit.

When the first (ingress) unit performs the look-up in its forwarding database, and the egress port is known, subsequent units just need to forward the packet by the shortest path to the destination unit where it will be transmitted upon the appropriate port. The 'subsequent' units do not need to perform a fresh destination look-up.

Figure 23:
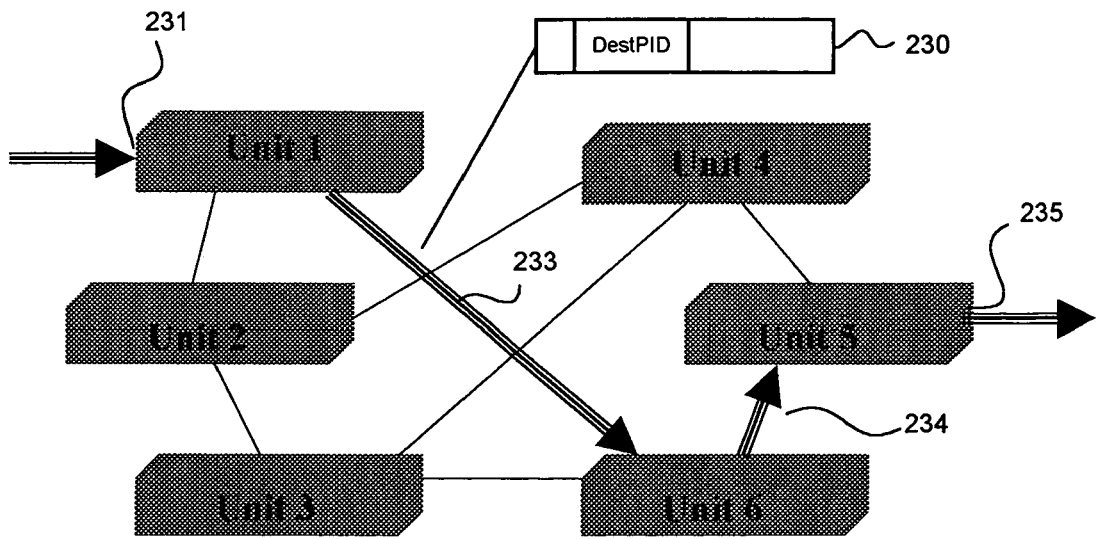
FIG. 23 illustrates a switching fabric.

FIG. 23 illustrates a simple example of source routing. The switching fabric consists of six units, unit 1 to unit 6 and various links. A packet (addressed data frame) is received at an 'ingress' or 'source' port 231 on unit 1. The port numbering scheme preferably uniquely identifies any port in the fabric. This unit performs a look-up and determines that the 'egress' port (or 'destination' port) for the packet is port 232 on unit 5. The optimum route may be determined by the DSPF protocol. In this example it is shown by way of example as via link 233 to unit 6 and link 234 to unit 5. While it is within the fabric the packet 230 includes a special 'header' (in addition to its usual MAC and IP addresses) including the identification (Dest-PID) of the egress port 232.

Multicasts and Unknown Egress Ports

If the first unit (within the fabric) which a packet encounters does not know the port from which to transmit the frame upon then the packet will be 'flooded'. Once the first unit has decided to flood the frame, all of the units will flood the packet. Even if other units know which port the frame should be transmitted upon, they must flood the frame. Otherwise the frame could be transmitted upon the same port a multiplicity of times.

Figure 24:
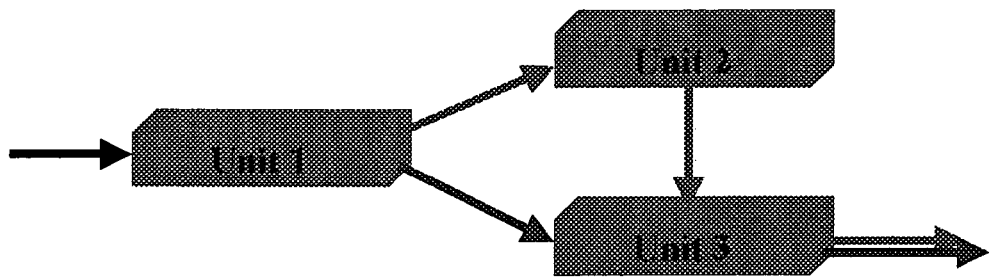
FIG. 24 illustrates another switching fabric.
Figure 25:
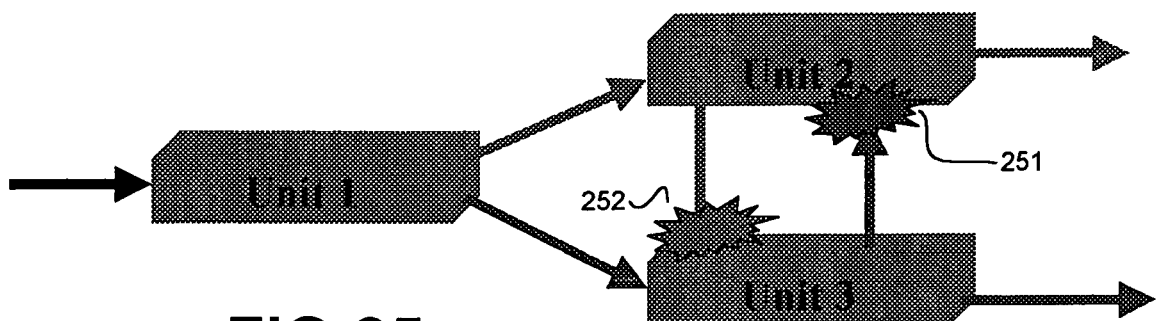
FIG. 25 illustrates a fault condition for the fabric shown in FIG. 24.

FIG. 24 shows a simple three-unit example. A packet is received at unit 1 which does not know the destination port. Unit 1 therefore floods the packet to both the other units 2 and 3. Since the other units both know the destination port, they could have decided to forward the frame to that port. This would mean that the egress port on unit 3 received two copies of the frame to transmit—one via unit 2 and one directly from unit 1. If the first unit does not have a single unique address to transmit a frame to, then all units will flood that frame. If the look-up in a subsequent unit finds a single known port, that look-up result is ignored. Flooding does not have the same effect of transmitting the frame on multiple ports if a cascade port is configured to receive flooded traffic only if it is on the shortest path back to the unit that first received the flooded frame. Let is be assumed therefore that the optimum path from unit 2 to unit 1 is the direct link, i.e. not via unit 3 and that the optimum path from unit 3 to unit 1 is likewise the respective direct link. FIG. 25 indicates that port 251 will not receive flooded traffic via unit 3 from unit 1 and port 252 will not receive flooded traffic via unit 2 from unit 1 because in neither case is the port on the 'optimum' route.

This is the way that all traffic that has more than one destination port is handled. If the frame has not been received on the best path back to the original unit, it is discarded. Otherwise, the normal look-up process is performed. This may indicate that a multicast is to be transmitted upon various local ports only. If the look-up fails, the frame will be flooded to the ports in the VLAN (including the other cascade ports).

One purpose of the DSPF protocol in this context is to determine which is the optimum path to and from each other unit in the fabric, so as respectively to find the best path to send known unicasts along and to determine from which path 'unknown' unicasts and multicasts will be accepted.

Cascade Links

There is a difference between what one may describe as the cascade links and the physical links. A cascade link may be regarded as being the link through the fabric to a specific other unit in the network. The physical links are just the links to the neighbouring units.

Figure 26:
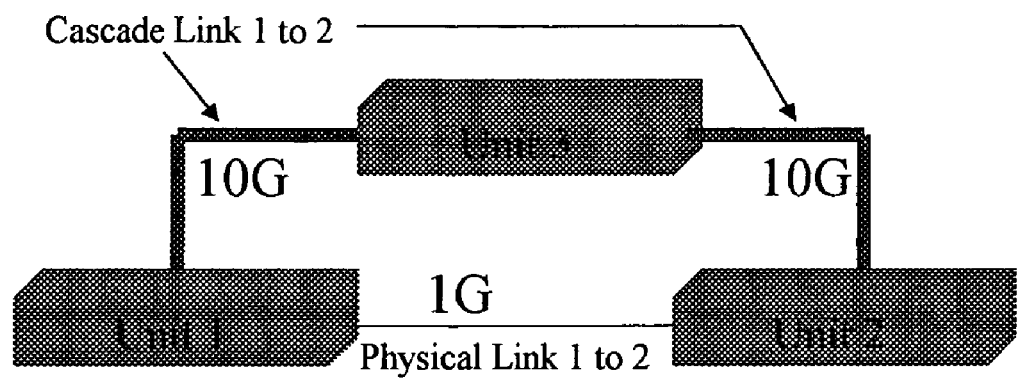
FIG. 26 illustrates a cascade link.

It is conceivable that the cascade link from unit 1 to unit 2 in FIG. 26 may not utilise the physical link between the units. This would be the case where the links via unit 3 have more bandwidth.

The physical links do not need to be taken down in order to bring down a cascade link. In fact, the physical links may remain 'up' all of the time and 'unknown destination' traffic is flooded to them all of the time. A cascade link can be brought 'down' for a specific remote unit by refusing to accept flooded traffic from the specified unit on that cascade. Programming the cascade link masks effects this. An alternative is to direct 'known' traffic to a null port rather than the local cascade link.

Routing Calculation

Figure 27:
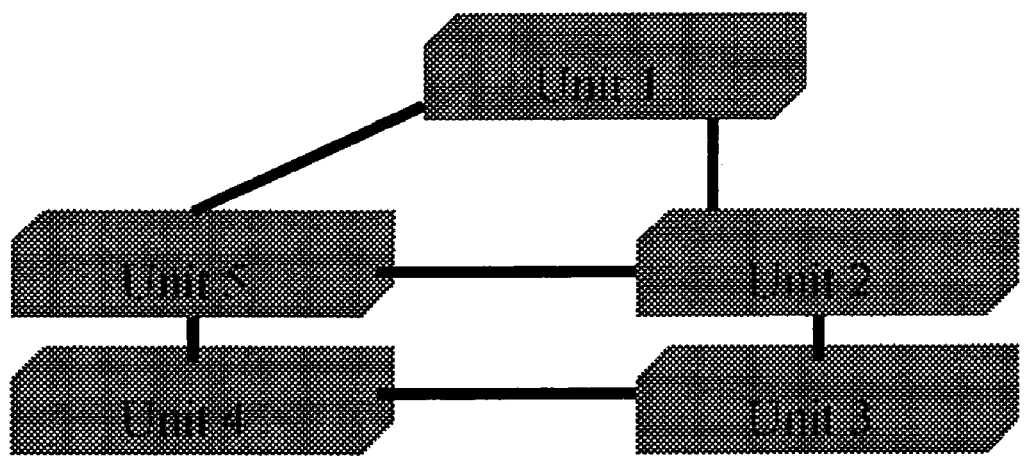
FIG. 27 illustrates a switching fabric for the purpose of a routing calculation.

An example of the use of DSPF protocol in calculating the optimum route between a unit in a fabric and each other unit will be described with reference to FIG. 27. For clarity the operating algorithm will be described in plain language. In practice it will be expressed as a computer program in any suitable language. FIG. 7 shows a fabric having five active units (unit 1 to unit 5).

Each unit in the fabric will perform its own SPF calculation. Each unit is at a different place in the fabric and each unit will have (in general) a different set of best paths to the other units.

Each physical link possessed by a unit is directly connected to another unit in the fabric. Any looped-back link may be ignored. The unit at the other end of a link is the 'next-hop' unit on that link. As will be seen, although a unit may have a physical link directly to a neighbouring unit, that link does not necessarily represent the optimum path.

For each physical link between a pair of units, the fabric unit table holds two indications of the path cost for that link. For example, in Table 3, there is an indication (1000) of the path cost from unit 1 to unit 2 and an indication (also 1000) of the path cost from unit 2 to unit 1. Normally, one would expect each end of the link to indicate the same cost but there are times when the indications will differ. For instance, if the last link to a unit has gone down, the unit that can still be seen (i.e. reached) will have set the path cost to infinity. However, the relevant unit will not have received any updates from the 'lost' unit and so still have its last reported path cost in the fabric unit table. In time this discrepancy will be removed. When the paths are being calculated the worse of two possible path costs for the link should be presumed to be correct.

For the routing calculation a special table is needed for each unit that could be in the fabric. An example is shown in Table 9. A first 'column' of the table lists the units that are or could be in the fabric.

Each entry will specify the 'SPF state', i.e. the state of communications with the unit. As will be seen, this field may indicate 'Not yet reached'; or 'Not optimal; or 'Optimal'. These indicate respectively that the unit has not been reached yet; that the unit has been reached but is not yet known to be at its optimal location; and that the unit is at its optimal location.

Another field may indicate 'next-hop' units that have been selected for traffic to the specified unit. This is valid whether the unit passing network traffic or are holding off passing traffic until the fabric becomes stable. The field may indicate (as explained below) more than one 'next hop'.

The table also specifies the computed cumulative path cost to reach the unit. This is derived each time the SPF is run and is exemplified below.

The list of next-hop units are those that can reach the unit at the current cumulative path cost and is used in the SPF run and for balancing the fabric connections.

Calculation

EXAMPLE I

Table 9 illustrates the start of a SPF calculation for 'unit 1'. The entries for the other units are set as follows. The SPF State is set to 'not yet reached'. The cumulative path cost is set to infinity (probably all-ones). The list of next-hop units is cleared. The SPF State for itself (i.e. unit 1) is set to 'optimal' and the path cost is set to zero.

The list of next-hop units will not be used but would preferably be cleared for safety.

TABLE 9

| To Unit | SPF State | Cumulative Path Cost | Next Hop List |
|---|---|---|---|
| 1 | Optimal | 0 | |
| 2 | Not yet reached | — | |
| 3 | Not yet reached | — | |

TABLE 9-continued

| To Unit | SPF State | Cumulative Path Cost | Next Hop List |
|---|---|---|---|
| 4 | Not yet reached | — | |
| 5 | Not yet reached | — | |
| 6 | Not yet reached | — | |
| 7 | Not yet reached | — | |
| 8 | Not yet reached | — | |

The algorithm now finds each potential link from this unit. For each available link (path cost not invalid) the unit entry for the remote unit is updated as follows. The path cost is set to the path cost of the link. The SPF State is set to 'not optimal' and the unit is added into the next-hop list.

Table 10 is a simplified version of Table 3A, illustrating only the units and the relevant path costs.

TABLE 10

| From Unit | To the other units | | | | | | | |
|---|---|---|---|---|---|---|---|---|
| | 1 | 2 | 3 | 4 | 5 | 6 | 7 | 8 |
| 1 | — | 1 | — | — | 10 | — | — | — |
| 2 | 1 | — | 1 | — | 1 | — | — | — |
| 3 | — | 1 | — | 10 | — | — | — | — |
| 4 | — | — | 10 | — | 1 | — | — | — |
| 5 | 10 | 1 | — | 1 | — | — | — | — |
| 6 | — | — | — | — | — | — | — | — |
| 7 | — | — | — | — | — | — | — | — |
| 8 | — | — | — | — | — | — | — | — |

In this example it is assumed for example that the path cost between units 1 and 2 has the value 1, the path cost between units 1 and 5 is ten and so on. Incidentally, only the path costs between adjacent pairs of units will be known. Thus there is no path cost shown for units 1 and 3, because they are not connected by a mutual link. No path costs are shown in respect of units 6, 7 and 8 because they are not members of the fabric.

Unit 1 has two links. One link is to unit 2 with a path cost of unity and the other is to unit 5 with a path cost of ten. Adding these to the table produces the modified Table 11. Since a cumulative cost for the path from unit 1 to units 2 is known, unit 2 has been reached but the path is not known to be optional. Accordingly the entry for unit 2 (and similarly the entry for unit 5) is changed to 'Not optimal'. In each case an entry can now be made in the 'next-hop' list.

TABLE 11

| To Unit | SPF State | Cumulative Path Cost | Next Hop List |
|---|---|---|---|
| 1 | Optimal | 0 | |
| 2 | Not optimal | 1 | 2 |
| 3 | Not yet reached | — | |
| 4 | Not yet reached | — | |
| 5 | Not optimal | 10 | 5 |
| 6 | Not yet reached | — | |
| 7 | Not yet reached | — | |
| 8 | Not yet reached | — | |

The repeating part of the algorithm is now reached. The Table (Table 11) is searched for the units that are in the 'not optimal' state and select one with the lowest cumulative path cost. If there is no unit in the 'not optimal' state, then the algorithm has finished. Any units that are still in the 'not yet reached' state are not accessible. If two or more units share the lowest path cost, it does not matter which one is chosen first: the other ones will be processed soon.

In the example unit 2 is indicated as having the lowest path cost, so the state is changed to 'optimal'. Then each of the links from unit 2 is examined. Any links to units that are already in the optimal state, such as the link to unit 1 will be ignored. For the other units their path cost in the fabric unit table is compared with the sum of unit 2's path cost and the link's path cost.

Unit 2 has three links—to units 1, 3 and 5. The SPF state of unit 1 is already optimal, so that unit is ignored. Unit 3 has not yet been reached, so its state is updated to 'not optimal'. The path cost to unit 3 can be set to the sum of unit 2's path cost and the link's path cost (1+1=2). Now unit 2's next hop list should be copied to unit 3.

The link to unit 5 is more interesting. The path cost via unit 2 is 2. This is less than the current cumulative path cost (10) for unit 5. Accordingly the cumulative path cost to unit 5 is changed to the lower path cost via unit 2. This corresponds to a change in path from the direct path from unit 1 to unit 5 to the indirect, but less 'costly' path via unit 2. the next hop list is changed to show unit 2, and the next hop list will be copied to unit 5 (and elsewhere).

If the path costs had been equal, one would have added the next-hop list from unit 2 to the next-hop list for unit 5. This would then have been an example of an equal-cost multipath—where one could have used either path with the same cost. The table is now as shown in Table 12.

TABLE 12

| To Unit | SPF State | Cumulative Path Cost | Next Hop List |
|---|---|---|---|
| 1 | Optimal | 0 | |
| 2 | Optimal | 1 | 2 |
| 3 | Not optimal | 2 | 2 |
| 4 | Not yet reached | — | |
| 5 | Not optimal | 2 | 2 |
| 6 | Not yet reached | — | |
| 7 | Not yet reached | — | |
| 8 | Not yet reached | — | |

Here is an example of where one could choose to expand the path data from either unit 3 or unit 5. It does not matter which, so arbitrarily unit 3 is chosen. This has links to unit 2 (optimal) and unit 4 (cost=10). Expanding as above one obtains Table 13.

TABLE 13

| To Unit | SPF State | Cumulative Path Cost | Next Hop List |
|---|---|---|---|
| 1 | Optimal | 0 | |
| 2 | Optimal | 1 | 2 |
| 3 | Optimal | 2 | 2 |
| 4 | Not optimal | 12 | 2 |
| 5 | Not optimal | 2 | 2 |
| 6 | Not yet reached | — | |
| 7 | Not yet reached | — | |
| 8 | Not yet reached | — | |

Now the 'not optimal' unit with the lowest path cost is unit 5. This has links to unit 1 (optimal), unit 2 (optimal) and unit 4 (cost=1). The path cost to unit 4 via unit 5 is less than the current path cost and so the cumulative path cost is changed.

Finally the paths for unit 4 will be expanded to find that this unit has links only to optimal units as shown by Table 14.

TABLE 14

| To Unit | SPF State | Cumulative Path Cost | Next Hop List |
|---|---|---|---|
| 1 | Optimal | 0 | |
| 2 | Optimal | 1 | 2 |
| 3 | Optimal | 2 | 2 |
| 4 | Optimal | 3 | 2 |
| 5 | Optimal | 2 | 2 |
| 6 | Not yet reached | — | |
| 7 | Not yet reached | — | |
| 8 | Not yet reached | — | |

There are no more units in the 'not optimal' state so the algorithm terminates. The routing table indicates that the lowest path cost from unit 1 to all the other units is obtained. The table also indicates that the notionally numbered units 6, 7 and 8 cannot be reached.

EXAMPLE II

Figure 28:
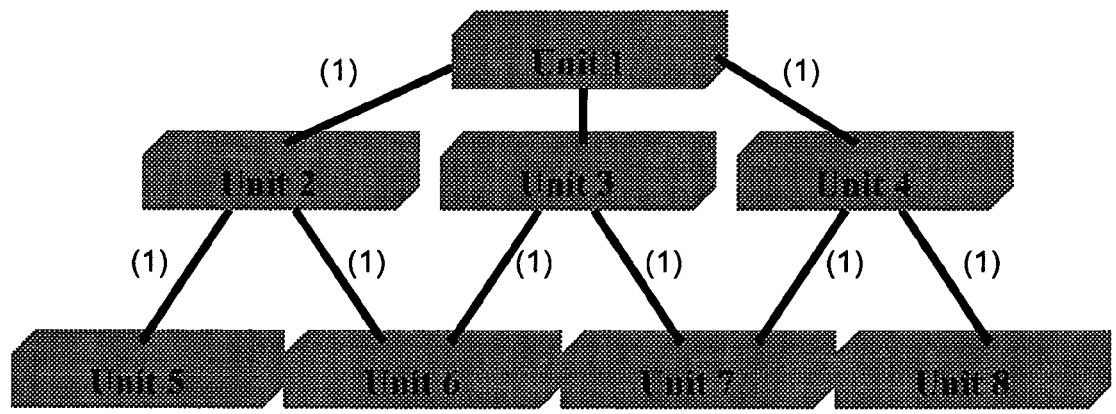
FIG. 28 illustrates another switching fabric for the purpose of a routing calculation.

This example is a calculation for the fabric shown in FIG. 1, shown again as FIG. 28, on the assumption that all the paths are equal to 1. The expansion of units 1 and 2 is similar to the previous example, and so by expanding paths for units 1 and 2 the routing table is as shown in Table 15.

TABLE 15

| To Unit | SPF State | Cumulative Path Cost | Next Hop List |
|---|---|---|---|
| 1 | Optimal | 0 | |
| 2 | Optimal | 1 | 2 |
| 3 | Not optimal | 1 | 3 |
| 4 | Not optimal | 1 | 4 |
| 5 | Not optimal | 2 | 2 |
| 6 | Not optimal | 2 | 2 |
| 7 | Not yet reached | — | |
| 8 | Not yet reached | — | |

When paths for unit 3 are expanded, it is found that unit 6 can be reached in two ways, and that the path cost for each is the same. This is an equal-cost multipath. The next hop lists are combined to get the new list for unit 6. The table now becomes as shown in Table 16.

TABLE 16

| To Unit | SPF State | Cumulative Path Cost | Next Hop List |
|---|---|---|---|
| 1 | Optimal | 0 | |
| 2 | Optimal | 1 | 2 |
| 3 | Optimal | 1 | 3 |
| 4 | Not optimal | 1 | 4 |
| 5 | Not optimal | 2 | 2 |
| 6 | Not optimal | 2 | 2, 3 |
| 7 | Not optimal | 2 | 3 |
| 8 | Not yet reached | — | |

The final table will be as shown in Table 17.

TABLE 17

| To Unit | SPF State | Cumulative Path Cost | Next Hop List |
|---|---|---|---|
| 1 | Optimal | 0 | |
| 2 | Optimal | 1 | 2 |
| 3 | Optimal | 1 | 3 |

TABLE 17-continued

| To Unit | SPF State | Cumulative Path Cost | Next Hop List |
|---------|-----------|----------------------|---------------|
| 4 | Optimal | 1 | 4 |
| 5 | Optimal | 2 | 2 |
| 6 | Optimal | 2 | 2, 3 |
| 7 | Optimal | 2 | 3, 4 |
| 8 | Optimal | 2 | 4 |

One can choose to use either link 2 or link 3 to get to unit 6 from unit 1. One can se either link 3 or link 4 to get to unit 7 from unit 1.

EXAMPLE III

Figure 29:
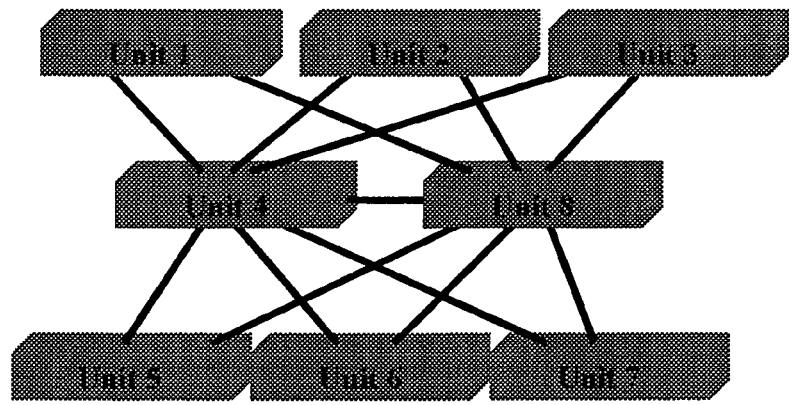
FIG. 29 illustrates yet another switching fabric for the purpose of a routing calculation.

FIG. 29 illustrates another switching fabric, with eight units (1-8) and connecting links. The switching fabric corresponds to that shown in FIG. 22. In this example all the path links have a path cost of unity. A calculation using the DSPF algorithm described above would yield the routing table shown in Table 18.

TABLE 18

| To Unit | SPF State | Cumulative Path Cost | Next Hop List |
|---------|-----------|----------------------|---------------|
| 1 | Optimal | 0 | |
| 2 | Optimal | 2 | 4, 8 |
| 3 | Optimal | 2 | 4, 8 |
| 4 | Optimal | 1 | 4 |
| 5 | Optimal | 2 | 4, 8 |
| 6 | Optimal | 2 | 4, 8 |
| 7 | Optimal | 2 | 4, 8 |
| 8 | Optimal | 1 | 8 |

This network has many equal-cost multipaths. If one merely chooses the first available next-hop from the list, almost all the data sent across the fabric would pass through the link to switch 4. It is desirable therefore that, mainly for these special circumstances, the next-hop usage is rendered more even.

Balancing the Next Hop Usage

Balancing the next-hop usage is only needed when there is more than one next-hop in an entry in the next-hop list. Any unit that only has a single next-hop unit in the list can be reached only through that one unit.

Various algorithms which provide a priori balancing could be employed. In general they will include an arbitrary selection of at least some next hops from a plurality of options. The following is given by way of example.

The exemplary algorithm assigns those units that must be assigned to a specific next-hop to that next hop. Then the list of units that can be assigned to more than one next-hop is progressively examined. A unit is allocated to the first link to which it can be allocated and which has the lowest number of units allocated to it already. This process is applied to all the units with more than one next hop.

Units 4 and 8 must be allocated to next-hops 4 and 8 respectively. Both next-hops now have one unit allocated to them. The first unit that can be assigned to more than one hop is unit 2. It is assigned to the first link to which it can be allocated and which has the lowest number of units allocated to it already. This is next-hop 4. Next-hop 4 now has two units assigned to it. When unit 3 is considered, the first link to which it can be allocated and which the lowest number of units allocated to it already is next-hop 8.

After working through all of the units the assignment becomes as shown in Table 20

TABLE 20

| To Unit | SPF State | Path Cost | Assigned Next Hop | Next Hop List |
|---------|-----------|-----------|-------------------|---------------|
| 1 | Optimal | 0 | | |
| 2 | Optimal | 2 | 4 | 4, 8 |
| 3 | Optimal | 2 | 8 | 4, 8 |
| 4 | Optimal | 1 | 4 | 4 |
| 5 | Optimal | 2 | 4 | 4, 8 |
| 6 | Optimal | 2 | 8 | 4, 8 |
| 7 | Optimal | 2 | 4 | 4, 8 |
| 8 | Optimal | 1 | 8 | 8 |

The invention claimed is:

1. A network unit for use in a switching fabric comprising a plurality of network units each having ports for the reception and forwarding of data packets, each unit having at least one fabric port connected to a partner port on another one of the network units by at least one of a multiplicity of links which interconnect the network units; wherein said network unit is organized:
   (a) to store a table which for each network unit in the switching fabric indicates a respective change identification number;
   (b) on the detection of a change in operational status relating to the unit to increment the unit's change identification number;
   (c) to broadcast protocol packets which indicate the incremented change identification number;
   (d) to receive corresponding packets from the other units;
   (e) to updates said table in accordance with incremented values;
   (f) to determine when the last change identification numbers in said are the same for all the units; and
   wherein said network unit maintains an indication of a fabric state for all the units, the fabric states including a first 'stable' state denoting normal operation and a second 'unstable' state indicating lack of match of change identification numbers.

2. A network unit as in claim 1 Wherein each of the protocol packets broadcast by the network unit contains the last change identification numbers notified to said unit for all the units in the fabric.

3. A network unit as in claim 1 wherein on detection of a change in the table the network unit blocks the ports to the passage of said data packets.

4. A network unit as in claim 1 wherein the fabric states include a third state indicating a match of the change identification numbers and a fourth state when all the units exhibit a ready state.

5. A network unit as in claim 4 wherein the network unit performs a routing computation within the switching fabric when the network unit is in the said third state and on completion of said computation enters said first, stable state.

6. A network unit as in claim 5 wherein the network unit unblocks said ports for the passage of said data packets.

7. A network unit as in claim 1 wherein the network unit is operable to perform, employing path cost data in said table, a routing algorithm within said switching fabric.

8. A work unit as in claim 7 wherein said switching fabric has a predetermined structure specified as one of a list of finite structures and said unit selects a structure from data in said table.

9. A network unit as in claim 7 wherein said network unit selects routes on the basis of known path costs between the network unit and other units to which it is directly connected and progressively on the basis of path costs between those other units and further units to which they are directly connected and so on.

10. A network unit as in claim 9 wherein the network unit computes for each other unit a cumulative path cost of a provisionally selected route and changes said route on determination of a different route of lower cost.

11. A network unit as in claim 9 wherein said network unit applies a load balancing algorithm to select between a plurality of routes of the same path cost.

* * * * *